(12) United States Patent
Jia et al.

(10) Patent No.: US 12,284,682 B2
(45) Date of Patent: Apr. 22, 2025

(54) RANDOM ACCESS METHOD AND APPARATUS AND COMMUNICATION SYSTEM

(71) Applicant: FUJITSU LIMITED, Kawasaki (JP)

(72) Inventors: Meiyi Jia, Beijing (CN); Qinyan Jiang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 485 days.

(21) Appl. No.: 17/702,899

(22) Filed: Mar. 24, 2022

(65) Prior Publication Data
US 2022/0217785 A1    Jul. 7, 2022

Related U.S. Application Data

(63) Continuation of application No. PCT/CN2019/109265, filed on Sep. 30, 2019.

(51) Int. Cl.
*H04W 74/0833* (2024.01)
*H04W 72/542* (2023.01)
*H04W 74/00* (2009.01)

(52) U.S. Cl.
CPC ..... *H04W 74/0833* (2013.01); *H04W 72/542* (2023.01); *H04W 74/006* (2013.01)

(58) Field of Classification Search
None
See application file for complete search history.

(56) References Cited

U.S. PATENT DOCUMENTS

| | | |
|---|---|---|
| 2018/0115940 A1 | 4/2018 | Abedini et al. |
| 2018/0205585 A1 | 7/2018 | Sadiq et al. |
| 2018/0279136 A1 | 9/2018 | Tsai et al. |
| 2018/0368142 A1 | 12/2018 | Liou |
| 2018/0368187 A1 | 12/2018 | Jung et al. |
| 2019/0082471 A1 | 3/2019 | Tsai et al. |
| 2019/0239212 A1 | 8/2019 | Wang et al. |
| 2019/0268947 A1 | 8/2019 | Zhang et al. |
| 2020/0015236 A1* | 1/2020 | Kung ................ H04B 7/04 |

(Continued)

FOREIGN PATENT DOCUMENTS

| | | |
|---|---|---|
| CN | 108093480 A | 5/2018 |
| CN | 109152054 A | 1/2019 |
| CN | 110016734 A | 7/2019 |

(Continued)

OTHER PUBLICATIONS

Notice of Reasons for Refusal issued by the Japan Patent Office for corresponding Japanese Patent Application No. 2022-519225, mailed on Apr. 4, 2023, with an English translation.

(Continued)

*Primary Examiner* — Christine T Duong

(74) *Attorney, Agent, or Firm* — Myers Wolin, LLC

(57) ABSTRACT

Embodiments of this disclosure provide a random access method and apparatus and a system. The method includes: a terminal equipment selects (or determines) a first downlink reference signal and/or a second downlink reference signal, there existing a quasi co-location (QCL) relationship between the first downlink reference signal and the second downlink reference signal; and the terminal equipment determines a random access resource according to the first downlink reference signal and/or the second downlink reference signal.

14 Claims, 7 Drawing Sheets

(56) References Cited

U.S. PATENT DOCUMENTS

2020/0229185 A1  7/2020  Zhang et al.
2022/0086922 A1* 3/2022  He ................... H04W 74/0841

FOREIGN PATENT DOCUMENTS

| CN | 110063083 A | 7/2019 |
|---|---|---|
| CN | 110139382 A | 8/2019 |
| CN | 110178318 A | 8/2019 |
| CN | 110268766 A | 9/2019 |
| JP | 2019-121952 A | 7/2019 |
| WO | 2018/084618 A1 | 5/2018 |
| WO | 2019/031903 A1 | 2/2019 |

OTHER PUBLICATIONS

LG Electronics, "Initial access and mobility for NR-U", Agenda Item: 7.2.2.2.2, 3GPP TSG-RAN WG1 Meeting #98, R1-1908536 Prague, CZ, Aug. 26-30, 2019.

International Search Report and Written Opinion of the International Searching Authority issued by the China National Intellectual Property Administration for corresponding International Patent Application No. PCT/CN2019/109265, mailed on Jun. 29, 2020, with an English translation.

Extended European search report with supplementary European search report and the European search opinion issued by the European Patent Office for corresponding European Patent Application No. 19947713.4-1215, dated Sep. 5, 2022.

Ericsson, "Enhancements to initial access procedure", Agenda Item: 7.2.2.2.2, 3GPP TSG-RAN WG1 Meeting AH #1901, R1-1900999, Taipei, Taiwan, Jan. 21-25, 2019.

Ericsson, "Enhancements to initial access procedure", Agenda Item: 7.2.2.2.2, 3GPP TSG-RAN WG1 Meeting #96b, R1-1904336, Xi'an, China, Apr. 8-12, 2019.

LG Electronics, "Initial access and mobility for NR-U", Agenda Item: 7.2.2.2.2, 3GPP TSG-RAN WG1 Ad-Hoc Meeting #1901, R1-1900607, Taipei, Taiwan, Jan. 21-25, 2019.

First Notification of Office Action and Search Report issued by the China National Intellectual Property Administration for corresponding Chinese Patent Application No. 201980100412.3, mailed on Nov. 25, 2024, with an English translation.

3GPP TR 38.802 V1.2.0, "3rd Generation Partnership Project; Technical Specification Group Radio Access Network; Study on New Radio (NR) Access Technology; Physical Layer Aspects (Release 14)", Feb. 2017, (NTT Docomo, R1-1703622) downloaded from: https://www.3gpp.org/ftp/TSG_RAN/WG1_RL1/TSGR1_88/Docs.

* cited by examiner

```
-- ASN1START
-- TAG-BEAMFAILURERECOVERYCONFIG-START

BeamFailureRecoveryConfig ::=       SEQUENCE {
    rootSequenceIndex-BFR               INTEGER (0..137)                                        OPTIONAL,
-- Need M
    rach-ConfigBFR                      RACH-ConfigGeneric                                      OPTIONAL,
-- Need M
    rsrp-ThresholdSSB                   RSRP-Range                                              OPTIONAL,
-- Need M
    candidateBeamRSList                 SEQUENCE (SIZE(1..maxNrofCandidateBeams)) OF PRACH-ResourceDedicatedBFR   OPTIONAL,
-- Need M
    ssb-perRACH-Occasion                ENUMERATED {oneEighth, oneFourth, oneHalf, one, two,
                                                    four, eight, sixteen}                       OPTIONAL,
-- Need M
    ra-ssb-OccasionMaskIndex            INTEGER (0..15)                                         OPTIONAL,
-- Need M
    recoverySearchSpaceId               SearchSpaceId                                           OPTIONAL,
-- Need R
    ra-Prioritization                   RA-Prioritization                                       OPTIONAL,
-- Need R
    beamFailureRecoveryTimer            ENUMERATED {ms10, ms20, ms40, ms60, ms80, ms100, ms150, ms200}   OPTIONAL,
-- Need M
    ...,
    [[
    msg1-SubcarrierSpacing-v1530        SubcarrierSpacing                                       OPTIONAL
-- Need M
    ]]
}

PRACH-ResourceDedicatedBFR ::=       CHOICE {
    ssb                                  BFR-SSB-Resource,
    csi-RS                               BFR-CSIRS-Resource
}

BFR-SSB-Resource ::=                SEQUENCE {
    ssb                                 SSB-Index,
    ra-PreambleIndex                    INTEGER (0..63),
    ...
}

BFR-CSIRS-Resource ::=              SEQUENCE {
    csi-RS                              NZP-CSI-RS-ResourceId,
    ra-OccasionList                     SEQUENCE (SIZE(1..maxRA-OccasionsPerCSIRS)) OF INTEGER (0..maxRA-Occasions-1)
OPTIONAL,    -- Need R
    ra-PreambleIndex                    INTEGER (0..63)
OPTIONAL,    -- Need R
    ...
}

-- TAG-BEAMFAILURERECOVERYCONFIG-STOP
-- ASN1STOP
```

FIG. 8

```
-- ASN1START
-- TAG-RACH-CONFIGDEDICATED-START

RACH-ConfigDedicated ::=        SEQUENCE {
    cfra                            CFRA                                OPTIONAL,   -- Need S
    ra-Prioritization               RA-Prioritization                   OPTIONAL,   -- Need N
    ...
}

CFRA ::=                SEQUENCE {
    occasions               SEQUENCE {
        rach-ConfigGeneric      RACH-ConfigGeneric,
        ssb-perRACH-Occasion    ENUMERATED {oneEighth, oneFourth, oneHalf, one, two, four, eight, sixteen}
    }                                                                   OPTIONAL,   -- Need S
    resources               CHOICE {
        ssb                     SEQUENCE {
            ssb-ResourceList        SEQUENCE (SIZE(1..maxRA-SSB-Resources)) OF CFRA-SSB-Resource,
            ra-ssb-OccasionMaskIndex    INTEGER (0..15)
        },
        csirs                   SEQUENCE {
            csirs-ResourceList      SEQUENCE (SIZE(1..maxRA-CSIRS-Resources)) OF CFRA-CSIRS-Resource,
            rsrp-ThresholdCSI-RS    RSRP-Range
        }
    },
    ...,
    [[
    totalNumberOfRA-Preambles-v1530 INTEGER (1..63)                     OPTIONAL -- Cond Occasions
    ]]
}

CFRA-SSB-Resource ::=   SEQUENCE {
    ssb                     SSB-Index,
    ra-PreambleIndex        INTEGER (0..63),
    ...
}

CFRA-CSIRS-Resource ::= SEQUENCE {
    csi-RS                  CSI-RS-Index,
    ra-OccasionList         SEQUENCE (SIZE(1..maxRA-OccasionsPerCSIRS)) OF INTEGER (0..maxRA-Occasions-1),
    ra-PreambleIndex        INTEGER (0..63),
    ...
}

-- TAG-RACH-CONFIGDEDICATED-STOP
-- ASN1STOP
```

FIG. 9

RANDOM ACCESS METHOD AND APPARATUS AND COMMUNICATION SYSTEM

CROSS-REFERENCE TO RELATED APPLICATION

This application is a continuation application of International Patent Application PCT/CN2019/109265 filed on Sep. 30, 2019, the entire contents of which are incorporated herein by reference.

FIELD

This disclosure relates to the field of communications.

BACKGROUND

In a New Radio (NR) system, for a terminal equipment, a random access (RA) procedure is as shown in FIG. 1, and the following operations are included at a media access control (MAC) sub-layer (referred to as an MAC sub-layer in brief):

operation 101: RA procedure initialization;
operation 102: resource selection;
operation 103: random access preamble transmission; and
operation 104: random access response (RAR) reception.

If the RAR is not successfully received, turn back to operation 102, select a resource and transmit the random access preamble on the selected resource (operation 103) once again, and perform subsequent operations.

If the RAR is successfully received and the current random access is contention-based random access (CBRA), after the RAR is successfully received, proceed to operation 105.

Operation 105: contention resolution; if the contention resolution is successful, the random access procedure is completed; if the contention resolution is unsuccessful, turn back to operation 102, select a resource and transmit the random access preamble on the selected resource (operation 103) once again, and perform subsequent operations.

If the RAR is successfully received and the current random access is contention-free random access (CFRA), the random access procedure is completed after the RAR is successfully received.

In operation 102, the MAC sub-layer can select a synchronization signal block (SSB) and/or a channel state information reference signal (CSI-RS) resource based on e.g. radio quality of a configured SSB and/or CSI-RS resource and whether there exist(s) a corresponding dedicated resource and/or preamble, or the MAC sub-layer can select any SSB, so as to select and/or use a corresponding random access resource to transmit a corresponding random access preamble.

In operation 103, for each random access preamble transmission, the MAC sub-layer instructs a target receiving power used for current transmission to a lower layer (such as a physical layer), so that the physical layer calculates corresponding transmitting power of the random access preamble.

In a case of random access preamble retransmission, due to the power ramping mechanism, the target receiving power indicated by the MAC sub-layer to the lower layer may be slowly increased, so that uplink retransmission (retransmission of a random access preamble) may be transmitted at power equal to or slightly higher than that of a last transmission (the last random access preamble transmission), which not only is beneficial to successful reception at a network side, but also causes no too much interference to other terminals. Currently, a counter related to power ramping, such as PREAMBLE_POWER_RAMPING_ COUNTER, is used to determine whether power of current transmission is increased relative to last transmission.

In the current mechanism, for the retransmission of the random access preamble, from the perspective of resource selection, only when the selected SSB resource does not change, the counter related to power ramping will be increased by 1, and the target receiving power indicated by the MAC sub-layer to the lower layer will be increased; otherwise, the counter remains unchanged.

In addition, in deciding whether the counter related to power ramping is increased by 1, the MAC sub-layer needs further to consider a notification of suspending (suspending indication) the counter, and when the notification exists, the counter related to power ramping remains unchanged. This notification is provided by the physical layer to the MAC sub-layer. For example, as shown in FIG. 1, if the terminal equipment changes a spatial domain transmission filter before performing retransmission of the random access preamble, the physical layer notifies a higher layer (the MAC sub-layer) to suspend the counter related to power ramping.

At the physical layer, as shown in FIG. 1, the terminal equipment transmits a random access preamble by using a smaller value in "maximum power $P_{CMAX,f,c}(i)$ configured by a network" and "a sum of target receiving power and a pathloss", wherein the target receiving power is instructed by the MAC sub-layer, and the pathloss is obtained by subtracting a reference signal receiving power (RSRP) value filtered by a higher layer from reference signal power provided by system information.

On the other hand, an NR radio access operation in unlicensed spectrum (NR-U) may be performed in a serving cell. In a cell of NR-U (referred to as an NR-U cell for short), before transmission is performed, a network device and a terminal equipment may perform a listen-before-talk (LBT) mechanism, that is, a transmission is performed only when a channel is identified as being idle. Furthermore, some new mechanisms are introduced into the NR-U to increase opportunities of data transmission, thereby reducing influence of LBT on data transmission.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in the random access resource selection and the random access preamble transmission in a random access procedure, downlink reference signals (DRSs, such as SSBs, and CSI-RSs) are used as references to determine time-frequency resources and transmitting power for transmitting the random access preambles, which means that the random access resource selection and the random access preamble transmission are both related to the downlink reference signals.

On the other hand, in order to reduce influence of LBT, NR-U supports more SSB positions. The 3rd Generation Partnership Project Radio Access Network Working Group 1 (3GPP RAN1) agreed to support the following Q values, {1, 2, 4, 8}, for the purpose of SSB QCL (quasi-colocation)

derivation. For a cell, either a serving cell or a neighbor cell, once Q is known to the terminal equipment, the terminal equipment may assume that there exists a QCL relationship between synchronization signal or broadcast channel (SS/PBCH) blocks within or across downlink reference signal (DRS) transmission or measurement windows that have the same value of modulo (A, Q); where, A is a sequence index of a PBCH DMRS (physical broadcast channel demodulation reference signal).

According to the above agreements, in NR-U, multiple SSBs may possibly correspond to one SSB, that is, multiple SSBs are quasi-co-located. For example, as shown in FIG. 2, assuming Q=4, then SSB index=0 and SSB index=4 are quasi-co-located, and SSB index=2 and SSB index=6 are quasi-co-located.

However, currently, in a random access procedure, multiple SSBs having a QCL relationship therebetween are not taken into account, which may cause the following problems:

problem 1: in the random access resource selection, assuming that SSB1 is not transmitted due to LBT, and SSB2 having a QCL relationship with SSB1 is transmitted after LBT, and thus SSB1 is unable to satisfy a radio quality condition, the terminal equipment may possibly not select a random access resource to which SSB1 corresponds for transmission even if corresponding random access resources are configured, which means that even if the network provides more transmission opportunities to overcome LBT, the terminal equipment will not perform transmission on the additionally provided transmission opportunities based on the existing mechanism.

problem 2: in the random access preamble transmission, if a selected SSB resource is changed, based on the existing mechanism, the transmitting power remains unchanged, which means that even if the currently selected SSB is an SSB having a QCL relationship with a previously selected SSB, the transmitting power will still remain unchanged, which makes the power ramping mechanism invalid, thereby reducing the success rate of random access.

In order to solve at least one of the above problems or other similar problems, embodiments of this disclosure provide a random access method and apparatus and a system.

According to an aspect of the embodiments of this disclosure, there is provided a random access method, the method including:

a terminal equipment selects (or determines) a first downlink reference signal and/or a second downlink reference signal, there existing a quasi co-location (QCL) relationship between the first downlink reference signal and the second downlink reference signal; and the terminal equipment determines (or selects) a random access resource according to the first downlink reference signal and/or the second downlink reference signal.

According to an aspect of the embodiments of this disclosure, there is provided a random access method, the method including:

a terminal equipment selects (or determines) a first downlink reference signal, there existing a quasi co-location (QCL) relationship between the first downlink reference signal and a second downlink reference signal; and the terminal equipment determines a next available PRACH occasion from consecutive PRACH occasions, the consecutive PRACH occasions referring to PRACH occasions corresponding to the first downlink reference signal, or PRACH occasions corresponding to the second downlink reference signal, or an intersection of the PRACH occasions corresponding to the first downlink reference signal and the PRACH occasions corresponding to the second downlink reference signal, or a union of the PRACH occasions corresponding to the first downlink reference signal and the PRACH occasions corresponding to which the second downlink reference signal.

According to an aspect of the embodiments of this disclosure, there is provided a random access method, the method including:

a terminal equipment increments a counter related to power ramping by 1 if there exists a QCL relationship between a selected (or determined) downlink reference signal and a downlink reference signal selected in the last random access preamble transmission.

According to an aspect of the embodiments of this disclosure, there is provided a random access apparatus, configured in a terminal equipment, the apparatus including:

a selecting unit configured to select (or determine) a first downlink reference signal and/or a second downlink reference signal, there existing a quasi co-location (QCL) relationship between the first downlink reference signal and the second downlink reference signal; and a determining unit configured to determine (or select) a random access resource according to the first downlink reference signal and/or the second downlink reference signal.

According to an aspect of the embodiments of this disclosure, there is provided a random access apparatus, configured in a terminal equipment, the apparatus including:

a selecting unit configured to select (or determine) a first downlink reference signal, there existing a quasi co-location (QCL) relationship between the first downlink reference signal and a second downlink reference signal; and a determining unit configured to determine a next available PRACH occasion from consecutive PRACH occasions, the consecutive PRACH occasions referring to PRACH occasions corresponding to the first downlink reference signal, or PRACH occasions corresponding to the second downlink reference signal, or an intersection of the PRACH occasions corresponding to the first downlink reference signal and the PRACH occasions corresponding to the second downlink reference signal, or a union of the PRACH occasions corresponding to the first downlink reference signal and the PRACH occasions corresponding to the second downlink reference signal.

According to an aspect of the embodiments of this disclosure, there is provided a random access apparatus, configured in a terminal equipment, the apparatus including:

a processing unit configured to increment a counter related to power ramping by 1 if there exists a QCL relationship between a selected (or determined) downlink reference signal and a downlink reference signal selected in the last random access preamble transmission.

According to an aspect of the embodiments of this disclosure, there is provided a configuration method, the method including:

a network device generates first configuration information and/or second configuration information and/or third configuration information;

the network device transmits the first configuration information and/or the second configuration information and/or the third configuration information; wherein, the first configuration information includes one or more pieces of the following information:

a first downlink reference signal and/or a second downlink reference signal, there existing a QCL relationship between the first downlink reference signal and the second downlink reference signal; and a random access preamble index, a random access preamble to which the random access preamble index corresponds being used for the first downlink reference signal or the second downlink reference signal in determining candidate beams;

the second configuration information includes one or more pieces of the following information:

random access channel dedicated configuration information, the random access channel dedicated configuration information indicating contention-free random access resource(s) associated with the first downlink reference signal and/or the second downlink reference signal;

identification of the first downlink reference signal or the second downlink reference signal, wherein the first downlink reference signal or the second downlink reference signal is a reference signal transmitted by a serving cell, and when a terminal equipment selects the first downlink reference signal and/or the second downlink reference signal, a random access preamble(s) to which the first downlink reference signal and/or the second downlink reference signal correspond(s) is/are available; and a random access preamble index, a random access preamble to which the random access preamble index corresponds being used for the first downlink reference signal or the second downlink reference signal in determining candidate beams;

and the third configuration information includes one or more pieces of the following information:

a random access preamble index; and an index of a synchronization signal or a broadcast channel.

According to an aspect of the embodiments of this disclosure, there is provided a configuration apparatus, configured in a network device, the apparatus including:

a generating unit configured to generate first configuration information and/or second configuration information and/or third configuration information;

a transmitting unit configured to transmit the first configuration information and/or the second configuration information and/or the third configuration information; wherein, the first configuration information includes one or more pieces of the following information:

a first downlink reference signal and/or a second downlink reference signal, there existing a QCL relationship between the first downlink reference signal and the second downlink reference signal; and a random access preamble index, a random access preamble to which the random access preamble index corresponds being used for the first downlink reference signal or the second downlink reference signal in determining candidate beams;

the second configuration information includes one or more pieces of the following information:

random access channel dedicated configuration information, the random access channel dedicated configuration information indicating contention-free random access resource(s) associated with the first downlink reference signal and/or the second downlink reference signal;

identification of the first downlink reference signal or the second downlink reference signal, wherein the first downlink reference signal or the second downlink reference signal is a reference signal transmitted by a serving cell, and when a terminal equipment selects the first downlink reference signal and/or the second downlink reference signal, a random access preamble(s) to which the first downlink reference signal and/or the second downlink reference signal correspond(s) is/are available; and a random access preamble index, a random access preamble to which the random access preamble index corresponds being used for the first downlink reference signal or the second downlink reference signal in determining candidate beams;

and the third configuration information includes one or more pieces of the following information:

a random access preamble index; and an index of a synchronization signal or a broadcast channel.

According to an aspect of the embodiments of this disclosure, there is provided a terminal equipment, including the random access apparatus as described above.

According to an aspect of the embodiments of this disclosure, there is provided a network device, including the configuration apparatus as described above.

According to an aspect of the embodiments of this disclosure, there is provided a communication system, including the network device and the terminal equipment as described above.

According to an aspect of the embodiments of this disclosure, there is provided a computer readable program, which, when executed in a terminal equipment, will cause a computer to carry out the random access method as described above in the terminal equipment.

According to an aspect of the embodiments of this disclosure, there is provided a storage medium storing a computer readable program, which will cause a computer to carry out the random access method as described above in a terminal equipment.

According to an aspect of the embodiments of this disclosure, there is provided a computer readable program, which, when executed in a network device, will cause a computer to carry out the configuration method as described above in the network device.

According to an aspect of the embodiments of this disclosure, there is provided a storage medium storing a computer readable program, which will cause a computer to carry out the configuration method as described above in a network device.

One of the advantages of the embodiments of this disclosure exists in that a success rate of random access is improved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 8 is a schematic diagram of an example of a part of contents of a beam failure recovery configuration information element;

FIG. 9 is a schematic diagram of an example of a part of contents of a random access channel dedicated configuration information element;

DETAILED DESCRIPTION

Figure 1:
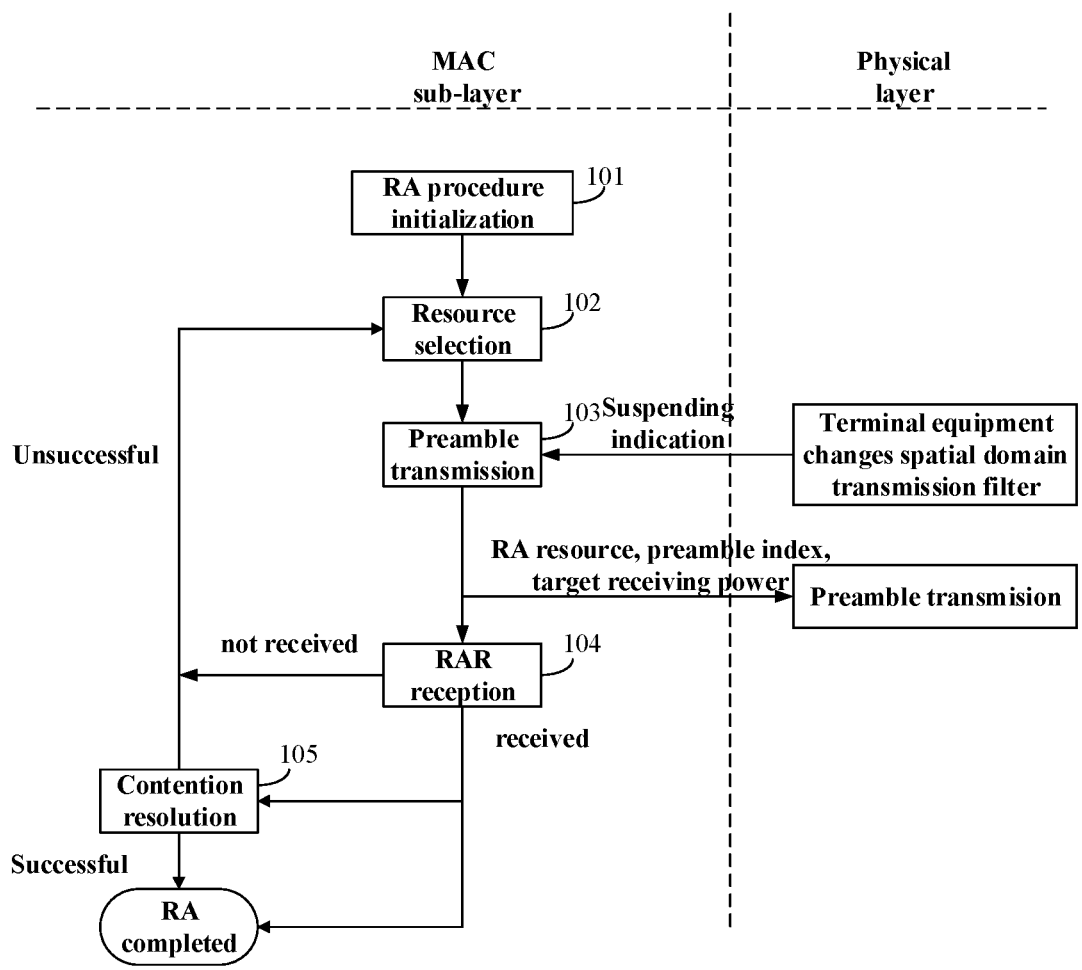
FIG. 1 is schematic diagram of a random access procedure.
Figure 2:
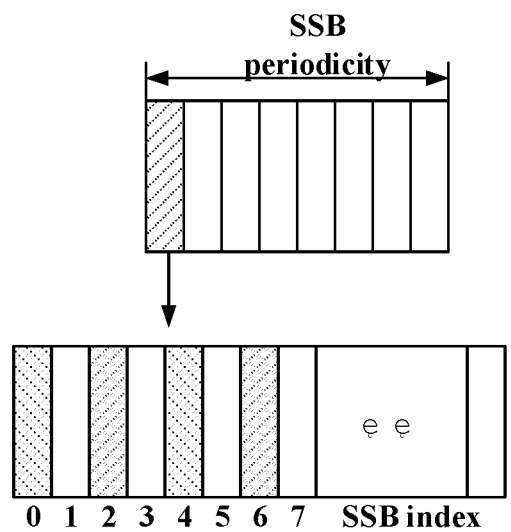
FIG. 2 is a schematic diagram of SSB transmissions in NR-U.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" refers to, for example, an equipment accessing to a communication network and receiving network services via a network device, and may also be referred to as "a terminal equipment (TE)". The terminal equipment may be fixed or mobile, and may also be referred to as a mobile station (MS), a terminal, a user, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

A scenario of an embodiment of this disclosure shall be described below by way of an example; however, this disclosure is not limited thereto.

Figure 3:
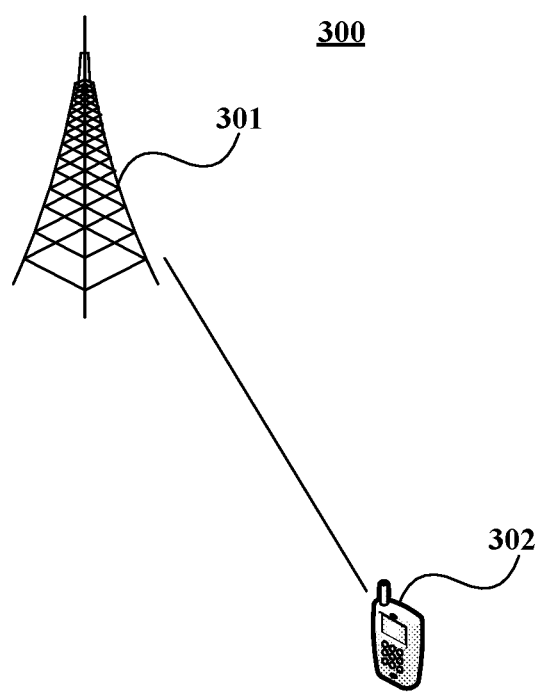
FIG. 3 is a schematic diagram of a communication system of an embodiment of this disclosure.

FIG. 3 is a schematic diagram of a communication system of an embodiment of this disclosure, in which a case where a terminal equipment and a network device are taken as examples is schematically shown. As shown in FIG. 3, the communication system 300 may include a network device 301 and a terminal equipment 302. For the sake of simplicity, an example having only one terminal equipment is schematically given in FIG. 3. The network device 301 is, for example, a network device gNB in an NR system.

In the embodiment of this disclosure, existing traffics or traffics that may be implemented in the future may be performed between the network device 301 and the terminal equipment 302. For example, such traffics may include but not limited to enhanced mobile broadband (eMBB), massive machine type communication (mMTC), and ultra-reliable and low-latency communication (URLLC), etc.

The terminal equipment 302 may transmit data to the network device 301, such as in a grant-free manner. The network device 301 may receive data transmitted by one or more terminal equipments 302, and feed back information to the terminal equipment 302, such as acknowledgement (ACK) information or non-acknowledgement (NACK) information, and the terminal equipment 302 may acknowledge to terminate a transmission process, or may perform new data transmission, or may perform data retransmission.

Various embodiments of this disclosure shall be described below with reference to the accompanying drawings. These embodiments are exemplary only, and are not intended to limit this disclosure.

Embodiment of a First Aspect

The embodiment of the first aspect of this disclosure provides a random access method, applicable to a terminal equipment, such as the terminal equipment 302 shown in FIG. 3.

Figure 4:
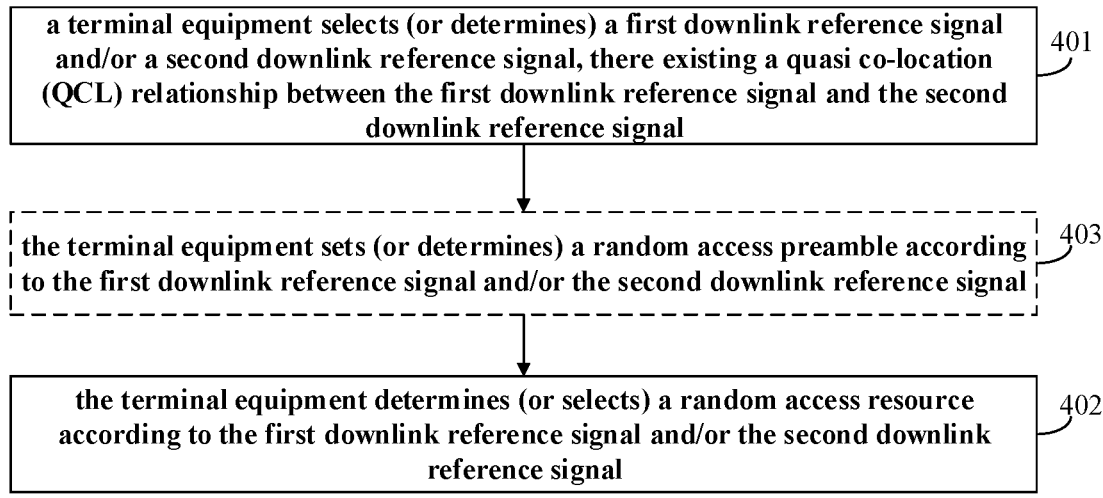
FIG. 4 is a schematic diagram of the random access method of an embodiment of this disclosure.

FIG. 4 is a schematic diagram of the random access method of the embodiment of this disclosure. Referring to FIG. 4, the method includes:
operation 401: a terminal equipment selects (or determines) a first downlink reference signal and/or a second downlink reference signal, there existing a quasi co-location (QCL) relationship between the first downlink reference signal and the second downlink reference signal; and operation 402: the terminal equipment determines (or selects) a random access resource according to the first downlink reference signal and/or the second downlink reference signal.

In the embodiment of this disclosure, there existing a QCL relationship between the first downlink reference signal and the second downlink reference signal refers to that the value of A modulo Q to which the first downlink reference signal corresponds is identical to the value of A modulo Q to which the second downlink reference signal corresponds, A being a sequence index of a physical broadcast channel downlink demodulation reference signal (PBCH DMRS), and Q being a parameter or a fixed value configured by a network device.

In the embodiment of this disclosure, multiple downlink reference signals having QCL relationships are considered in selecting random access resources, thereby improving a success rate of random access.

In this embodiment of this disclosure, the above first downlink reference signal and the above second downlink reference signal are, for example, SSBs, or CSI-RSs; however, this disclosure is not limited thereto.

In the embodiment of this disclosure, as shown in FIG. 4, the method may further include:
operation 403: the terminal equipment sets (or determines) a random access preamble according to the first downlink reference signal and/or the second downlink reference signal.

An order of execution of operation 402 and operation 403 is not limited in this application. FIG. 4 shows an example that operation 403 is executed before operation 402, and in other examples, operation 403 may be executed after operation 402.

In an embodiment, the above first downlink reference signal and/or the above second downlink reference signal are included in a downlink control information (DCI) transmitted by the network device, and if the DCI indicates an index of the random access preamble and the index of the random access preamble is not 0b00000, in operation 401, the terminal equipment selects the above first downlink reference signal and/or the above second downlink reference signal as a reference/references.

In this embodiment, there exists a QCL relationship between the reference signals in the downlink control information, the first downlink reference signal and/or the second downlink reference signal is/are selected from the reference signals in the downlink control information, and the number of the first downlink reference signal and/or the above second downlink reference signal may be one or more than one. That is, if the DCI includes multiple downlink reference signals and there exists a QCL relationship between these downlink reference signals, the terminal equipment may select one or more than one of them as a reference/references. The terminal equipment may select arbitrarily, or may select according to a predetermined rule, which is not limited in this application.

In this embodiment, if the selected downlink reference signal(s) (the first downlink reference signal and/or the second downlink reference signal) is/are included in the above DCI, in operation 403, the terminal equipment may set the index of the random access preamble (PREAMBLE_INDEX) to be an index indicated (or explicitly provided) in the DCI; and if the selected downlink reference signal(s) (the first downlink reference signal and/or the second downlink reference signal) is/are not included in the DCI, in operation 403, the terminal equipment may set the index of the random access preamble (PREAMBLE_IN- DEX) to be an index to which the selected downlink reference signal corresponds (or with which the selected downlink reference signal is associated).

In another embodiment, the terminal equipment may select the first downlink reference signal as a reference, or may select the second downlink reference signal as a reference, or simultaneously select the first downlink reference signal and the second downlink reference signal as references if the first downlink reference signal and the second downlink reference signal satisfy at least one of the following conditions that:
  RSRP of the first downlink reference signal is above a threshold;
  RSRP of the second downlink reference signal is above a threshold;
  the first downlink reference signal is included in a reference signal list (candidateBeamRSList) used for configuring candidate beam for beam failure recovery;
  the second downlink reference signal is included in a reference signal list (candidateBeamRSList) used for configuring candidate beam for beam failure recovery;
  the first downlink reference signal is indicated (or provided) by a network device via a downlink control information (DCI);
  the second downlink reference signal is indicated (or provided) by the network device via a downlink control information (DCI);
  a contention-free random access resource associated with the first downlink reference signal is indicated (or explicitly provided) by random access channel dedicated configuration information (rach-ConfigDedicated);
  a contention-free random access resource associated with the second downlink reference signal is indicated (or explicitly provided) by random access channel dedicated configuration information (rach-ConfigDedicated) by random access channel dedicated configuration information;
  the first downlink reference signal is not configured with a contention-free random access resource or the first downlink reference signal is used for a contention-based random access preamble selection procedure; and
  the second downlink reference signal is not configured with a contention-free random access resource or the second downlink reference signal is used for a contention-based random access preamble selection procedure.

In this embodiment, in at least one example, the selected downlink reference signal(s) may be included in a reference signal list (candidateBeamRSlist) used for configuring candidate beam for beam failure (recovery), which shall be described in later embodiments.

In this embodiment, in at least one example, the selected downlink reference signal(s) may also be indicated or provided by a downlink control information (DCI) provided by the network device, which shall be described in later embodiments.

In this embodiment, in at least one example, the contention-free random access resource associated with the selected downlink reference signal(s) may be explicitly provided by the random access channel dedicated configuration information (rach-ConfigDedicated), which shall be described in later embodiments.

In this embodiment, in at least one example, the selected downlink reference signal(s) is/are not configured with a contention-free random access resource, or the selected downlink reference signal(s) is/are used in a process of selection of a contention-based random access preamble.

In this embodiment, in operation 403, the terminal equipment may select a random access preamble randomly with equal probability from random access preambles associated with the selected downlink reference signal(s), and set an index of the random access preamble (PREAMBLE_INDEX) to be the index of the selected random access preamble. Or, in operation 403, the terminal equipment may set the index of the random access preamble (PREAMBLE_INDEX) to be an index (ra-PreambleIndex) of a random access preamble corresponding to (or associated therewith) the above first downlink reference signal and/or the above second downlink reference signal (i.e. the selected downlink reference signal and/or a downlink reference signal having the QCL relationship with the selected downlink reference signal).

In another embodiment, if the RSRP of the first downlink reference signal is above a threshold, the terminal equipment selects the first downlink reference signal, and if the RSRP of the second downlink reference signal is above a threshold, the terminal equipment selects the second downlink reference signal.

For example, if the first downlink reference signal satisfies at least one of the following conditions 1, the terminal equipment may select the first downlink reference signal, and if the second downlink reference signal satisfies at least one of the following conditions 2, the terminal equipment may select the second downlink reference signal.

Conditions 1 include that:
  the first downlink reference signal is included in a reference signal list (candidateBeamRSList) used for configuring candidate beam for beam failure recovery;
  the first downlink reference signal is indicated (or provided) by a network device via a downlink control information (DCI);
  a contention-free random access resource associated with the first downlink reference signal is indicated (or explicitly provided) by random access channel dedicated configuration information (rach-ConfigDedicated); and
  the first downlink reference signal is not configured with a contention-free random access resource or the first downlink reference signal is used for a contention-based random access preamble selection procedure.

And the conditions 2 include that:
  the second downlink reference signal is included in a reference signal list (candidateBeamRSList) used for configuring candidate beam for beam failure recovery;
  the second downlink reference signal is indicated (or provided) by a network device via a downlink control information (DCI);
  a contention-free random access resource associated with the second downlink reference signal is indicated (or explicitly provided) by random access channel dedicated configuration information (rach-ConfigDedicated); and
  the second downlink reference signal is not configured with a contention-free random access resource or the second downlink reference signal is used for a contention-based random access preamble selection procedure.

In a further embodiment, if the random access resource associated with the first downlink reference signal is configured, the terminal equipment selects the first downlink reference signal, and if the random access resource associated with the second downlink reference signal is configured, the terminal equipment selects the second downlink reference signal.

For example, if the random access resource satisfies at least one of the following conditions 3, the terminal equipment selects the first downlink reference signal, and if the random access resource satisfies at least one of the following conditions 4, the terminal equipment selects the second downlink reference signal.

Conditions 3 include that:
the random access resource associated with the first downlink reference signal is a contention-free random access resource;
the random access resource associated with the first downlink reference signal is a resource for system information (SI) request.

And conditions 4 include that:
the random access resource associated with the second downlink reference signal is a contention-free random access resource;
the random access resource associated with the second downlink reference signal is a resource for system information (SI) request.

In this example, the contention-free random access resource may be a resource requested for beam failure recovery, and the contention-free random access resource may be provided by the network device via RRC signaling.

Or, in this example, the contention-free random access resource may be indicated (or notified) by the network device via downlink control information (DCI).

Or, in this example, the random access procedure is initiated for a system information request, and a resource of the system information request is indicated (or explicitly provided) by the network device via RRC signaling.

In yet another embodiment, if the random access resource to which the first downlink reference signal or the second downlink reference signal corresponds (or associated therewith) is configured, in operation 401, the terminal equipment may select the first downlink reference signal as a reference, or may select the second downlink reference signal as a reference, or may select both the first downlink reference signal and the second downlink reference signal as references.

In this embodiment, in at least one example, the random access resource is a contention-free random access resource associated with the first downlink reference signal or the second downlink reference signal. If the random access resource is a contention-free random access resource associated with the first downlink reference signal, in operation 401, the terminal equipment may select the first downlink reference signal, or may select the second downlink reference signal having a QCL relationship with the first downlink reference signal. Likewise, if the random access resource is a contention-free random access resource associated with the second downlink reference signal, in operation 401, the terminal equipment may select the second downlink reference signal, or may select the first downlink reference signal having a QCL relationship with the second downlink reference signal.

In this example, the contention-free random access resource may be a resource requested for beam failure recovery, and the contention-free random access resource may be provided (or configured) by the network device via RRC signaling. However, this disclosure is not limited thereto, and the above contention-free random access resource may also be indicated (or notified or configured) by the network device via a downlink control information (DCI).

In this embodiment, in at least one example, the random access resource is a resource for system information (SI) request.

In this example, if the random access procedure is initiated for a system information request, and if the resource for the system information request has been indicated (or explicitly provided or configured) by the network device via RRC signaling, in operation 401, the terminal equipment may select the first downlink reference signal, or may select the second downlink reference signal having a QCL relationship with the first downlink reference signal.

In this embodiment, in operation 403, the terminal equipment may select a random access preamble according to the selected downlink reference signal (the first downlink reference signal and/or the second downlink reference signal), and then set an index of the random access preamble to be an index of the selected random access preamble.

For example, the terminal equipment may select a random access preamble randomly with equal probability from random access preambles associated with the downlink reference signal(s) selected in operation 401, and then set the index of the random access preamble to be an index of the selected random access preamble.

For another example, if the random access procedure is initiated for a system information request, and if the resource of the system information request has been indicated (or explicitly provided or configured) by the network device via RRC signaling, the terminal equipment may select a random access preamble corresponding to (or associated with) the selected downlink reference signal from random access preambles determined according to a parameter (ra-PreambleStartIndex) related to a random access preamble index, and set the index of the random access preamble (PREAMBLE_INDEX) to be an index of the selected random access preamble.

In this embodiment, in operation 403, the terminal equipment may also set the index of the random access preamble (PREAMBLE_INDEX) to be a random access preamble index (ra-PreambleIndex) corresponding to (or associated with) the above first downlink reference signal and/or the second downlink reference signal (i.e. the selected downlink reference signal and/or a downlink reference signal having a QCL relationship with the selected downlink reference signal).

In the embodiment of this disclosure, the multiple embodiments of operation 401 may be implemented separately, or may be implemented jointly, which is not limited in this disclosure. For example, the terminal equipment may select the first downlink reference signal when the RSRP of the first downlink reference signal is above a threshold (case 1); the terminal equipment may select the first downlink reference signal when the RSRP of the second downlink reference signal is above a threshold (case 2); the terminal equipment may select the first downlink reference signal when the random access resource corresponding to the first downlink reference signal is configured (case 3); the terminal equipment may select the first downlink reference signal when the random access resource corresponding to the second downlink reference signal is configured (case 4); the terminal equipment may select the first downlink reference signal and/or the second downlink reference signal when the RSRP of the first downlink reference signal is above a threshold and the random access resource corresponding to the first downlink reference signal is configured (case 5); the terminal equipment may select the first downlink reference signal and/or the second downlink reference signal when the RSRP of the first downlink reference signal is above a threshold and the random access resource corresponding to the second downlink reference signal is configured (case 6); the terminal equipment may select the first downlink reference signal and/or the second downlink reference signal when the RSRP of the second downlink reference signal is above a threshold and the random access resource corresponding to the first downlink reference signal is configured (case 7); and the terminal equipment may select the first downlink reference signal and/or the second downlink reference signal when the RSRP of the second downlink reference signal is above a threshold and the random access resource corresponding to the second downlink reference signal is configured (case 8).

Particular examples may possibly be:

example 1: if the random access procedure is initiated for beam failure if a beam failure timer is either not configured or not running, if contention-free random access (CFRA) resources for beam failure recovery request associated with the first downlink reference signal (such as an SSB) or the second downlink reference signal have been explicitly provided by RRC, and if a downlink reference signal (a first reference signal) with RSRP above a threshold amongst the first downlink reference signals in candidateBeamRSList is available, the first downlink reference signal or the second downlink reference signal is selected; and furthermore, PREAMBLE_INDEX is set to be an ra-PreambleIndex corresponding to a first downlink reference signal or a second downlink reference signal in a set of random access preambles of a beam failure recovery request. Here, there exists a QCL relationship between the first downlink reference signal and the second downlink reference signal;

example 2: if ra-PreambleIndex has been explicitly provided by DCI, and if ra-PreambleIndex is not 0b00000, PREAMBLE_INDEX is set to be the signalled ra-PreambleIndex; and furthermore, the first downlink reference signal notified by DCI is selected or the second downlink reference signal having the QCL relationship with the first downlink reference signal notified by DCI is selected.

In the embodiment of this disclosure, in operation 402, the above random access resource may be a PRACH occasion, and the terminal equipment may determine (or select) a next available PRACH occasion from consecutive PRACH occasions. Here, the consecutive PRACH occasions refer to PRACH occasions corresponding to the first downlink reference signal, or PRACH corresponding occasions to the second downlink reference signal, or an intersection of PRACH occasions corresponding to the first downlink reference signal and PRACH occasions corresponding to the second downlink reference signal, or a union of PRACH occasions corresponding to the first downlink reference signal and PRACH occasions corresponding to the second downlink reference signal.

In the embodiment of this disclosure, an MAC entity of the terminal equipment may select a PRACH occasion randomly with equal probability in the consecutive PRACH occasions and take the selected PRACH occasion as the next available PRACH occasion.

In the embodiment of this disclosure, if there exists QCL relationship between a currently selected downlink reference signal (referred to as a fourth downlink reference signal, such as the above first downlink reference signal and/or the second downlink reference signal) and a downlink reference signal selected in the last random access preamble transmission (referred to as a third downlink reference signal), the terminal equipment may further add 1 to the counter related to power ramping (PREAMBLE_POWER_RAMPING_COUNTER), thereby solve the above-described problem 2.

In at least one embodiment, the currently selected downlink reference signal is an SSB, the downlink reference signal selected in the last random access preamble transmission is an SSB, and there exists a QCL relationship between the currently selected downlink reference signal SSB and the last selected downlink reference signal SSB.

For example, the currently selected downlink reference signal is a first SSB, the downlink reference signal selected in the last random access preamble transmission is a second SSB, and there exists a QCL relationship between the first SSB and the second SSB, then the value of the counter related to power ramping (such as PREAMBLE_POWER_RAMPING_COUNTER) is increased by 1. Or, for another example, if PREAMBLE_TRANSMISSION_COUNTER is greater than 1, if no notification of suspending a power ramping counter from the physical layer is received, and if there exists a QCL relationship between the currently selected SSB and the SSB selected in the last random access preamble transmission, then the value of the counter related to power ramping (such as PREAMBLE_POWER_RAMPING_COUNTER) is increased by 1.

In at least one embodiment, the downlink reference signal selected in the last random access preamble transmission is a CSI-RS, and the currently selected downlink reference signal is an SSB, then there exists a QCL relationship between the SSB having a QCL relationship with the last selected downlink reference signal CSI-RS and the currently selected downlink reference signal SSB.

In at least one embodiment, the downlink reference signal selected in the last random access preamble transmission is an SSB, and the currently selected downlink reference signal is a CSI-RS, then there exists a QCL relationship between the SSB having a QCL relationship with the currently selected downlink reference signal CSI-RS and the downlink reference signal SSB selected in the last random access preamble transmission.

According to the method of the above embodiment, invalid power ramping mechanism is avoided, and the success rate of random access is improved.

Figure 5:
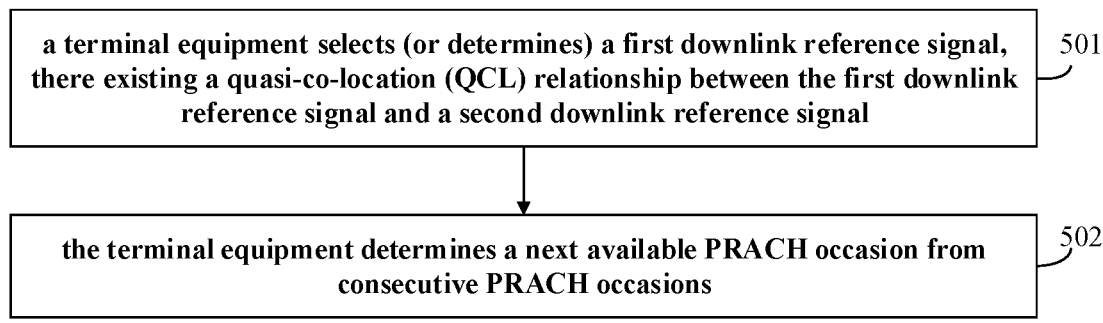
FIG. 5 is another schematic diagram of the random access method of the embodiment of this disclosure.

FIG. 5 is another schematic diagram of the random access method of the embodiment of this disclosure. As shown in FIG. 5, the method includes:

operation 501: a terminal equipment selects (or determines) a first downlink reference signal, there existing a quasi-co-location (QCL) relationship between the first downlink reference signal and a second downlink reference signal; and operation 502: the terminal equipment determines a next available PRACH occasion from consecutive PRACH occasions.

In the embodiment of this disclosure, the consecutive PRACH occasions refer to PRACH occasions corresponding to the first downlink reference signal, or PRACH occasions corresponding to the second downlink reference signal, or an intersection of the PRACH occasions corresponding to the first downlink reference signal and the PRACH occasions corresponding to the second downlink reference signal, or a union of the PRACH occasions corresponding to the first downlink reference signal and the PRACH occasions corresponding to the second downlink reference signal.

In the embodiment of this disclosure, there is no limitation on a method for selecting the first downlink reference signal, which may be implemented by operation 401 in FIG. 4, or may be implemented by existing means, which shall not be repeated here any further. With the method of the embodiment of this disclosure to perform random access, the success rate of the random access is improved.

In at least one embodiment, the MAC entity of the terminal equipment may select a PRACH occasion randomly with equal probability from the above consecutive PRACH occasions and take it as the next available PRACH occasion. However, this disclosure is not limited thereto, and the above PRACH occasions may not be consecutive PRACH occasions, and the terminal equipment may also select a PRACH occasion taken as the next available PRACH occasion via other entities or other means.

Figure 6:
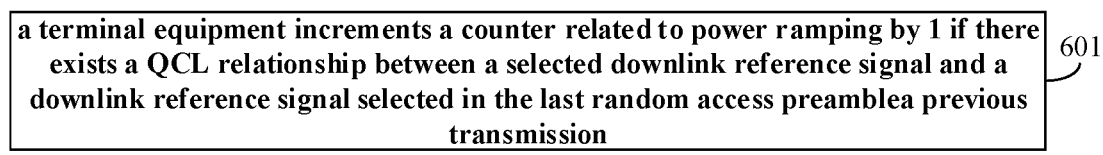
FIG. 6 is a further schematic diagram of the random access method of the embodiment of this disclosure.

FIG. 6 is a further schematic diagram of the random access method of the embodiment of this disclosure. As shown in FIG. 6, the method includes:

operation 601: a terminal equipment increments a counter related to power ramping by 1 if there exists a QCL relationship between a selected downlink reference signal and a downlink reference signal selected in the last random access preamble transmission.

In the embodiment of this disclosure, if there exists a QCL relationship between the selected downlink reference signal (a fourth downlink reference signal) and a downlink reference signal selected in the last random access preamble transmission (a third downlink reference signal), the value of the counter related to power ramping (PREAMBLE_POWER_RAMPING_COUNTER) is increased by 1, thereby solving the above problem 2.

In at least one embodiment, the selected downlink reference signal (the fourth downlink reference signal) is an SSB, and the downlink reference signal selected in the last random access preamble transmission (a third downlink reference signal) is an SSB, there existing a QCL relationship in operation 601 may be that there exists a QCL relationship between the selected downlink reference signal SSB and the downlink reference signal SSB selected in the last random access preamble transmission.

For example, the downlink reference signal selected by the terminal equipment is a first SSB, the downlink reference signal selected in the last random access preamble transmission is a second SSB, and there exists a QCL relationship between the first SSB and the second SSB, then the value of the counter related to power ramping (such as PREAMBLE_POWER_RAMPING_COUNTER) is increased by 1. Or, for another example, if PREAMBLE_TRANSMISSION_COUNTER is greater than 1, if no notification of suspending a power ramping counter from the physical layer is received, and if there exists a QCL relationship between the selected SSB and the SSB selected in the last random access preamble transmission, then the value of the counter related to power ramping (such as PREAMBLE_POWER_RAMPING_COUNTER) is increased by 1.

In at least one embodiment, the downlink reference signal (the third downlink reference signal) selected in the last random access preamble transmission is a CSI-RS, and the selected downlink reference signal (the fourth downlink reference signal) is an SSB, then there existing a QCL relationship in operation 601 may be that there exists a QCL relationship between the SSB having a QCL relationship with the downlink reference signal CSI-RS selected in the last random access preamble transmission and the selected downlink reference signal SSB.

In at least one embodiment, the downlink reference signal (the third downlink reference signal) selected in the last random access preamble transmission is an SSB, and the selected downlink reference signal (the fourth downlink reference signal) is a CSI-RS, then there existing a QCL relationship in operation 601 may be that there exists a QCL relationship between the SSB having a QCL relationship with the selected downlink reference signal CSI-RS and the downlink reference signal SSB selected in the last random access preamble transmission.

The above multiple embodiments are illustrative only, and this disclosure is not limited thereto. With the method of the embodiment of this disclosure, invalid power ramping mechanism is avoided, and the success rate of random access is improved.

According to the method of the embodiment of this disclosure, in selecting a downlink reference signal (such as an SSB), determining a random access resource and performing power ramping, the terminal equipment takes downlink reference signals with a QCL relationship therebetween into account, thereby effectively utilizing more transmission occasions provided by the network, overcoming problems brought by LBT, and ensuring the success rate of random access via the power ramping mechanism.

Furthermore, according to the method of the embodiment of this disclosure, the terminal equipment takes downlink reference signals with a QCL relationship therebetween into account in selecting random access resources, so that as long as one of the downlink reference signals with a QCL relationship therebetween satisfies a part or all of the conditions, it may be selected. And as long as one of the downlink reference signals with a QCL relationship therebetween is selected, its corresponding random access resource may be used to transmit the random access preambles, thereby effectively utilizing more transmission occasions introduced by the network for overcoming the LBT.

Moreover, according to the method of the embodiment of this disclosure, in performing random access preamble transmission, the terminal equipment takes downlink reference signals with a QCL relationship therebetween into account, so that when the downlink reference signals with a QCL relationship therebetween are selected, the power ramping mechanism may still operate. As the number of times of transmission increases, the transmitting power for transmitting the random access preambles may be increased, thereby ensuring the success rate of random access.

Embodiment of a Second Aspect

The embodiment of the second aspect of this disclosure provides a configuration method, applicable to a network device, which is processing at a network side corresponding to the method of the embodiment of the first aspect, with contents identical to those in the embodiment of the first aspect being not going to be repeated herein any further.

Figure 7:
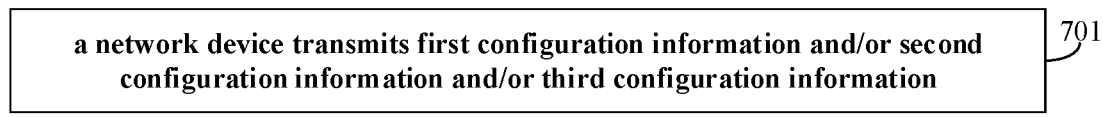
FIG. 7 is a schematic diagram of the configuration method of an embodiment of this disclosure.

FIG. 7 is a schematic diagram of the configuration method of the embodiment of this disclosure. As shown in FIG. 7, the method includes:

operation 701: a network device transmits first configuration information and/or second configuration information and/or third configuration information.

In the embodiment of this disclosure, the first configuration information includes one or more pieces of the following information: a first downlink reference signal and/or a second downlink reference signal, there existing a QCL relationship between the first downlink reference signal and the second downlink reference signal; and a random access preamble index, a random access preamble to which the random access preamble index corresponds being used for the first downlink reference signal or the second downlink reference signal in determining candidate beams.

In the embodiment of this disclosure, the second configuration information includes one or more pieces of the following information: random access channel dedicated configuration information, the random access channel dedicated configuration information indicating contention-free random access resource(s) associated with the first downlink reference signal and/or the second downlink reference signal; identification of the first downlink reference signal or the second downlink reference signal, wherein the first downlink reference signal or the second downlink reference signal is a reference signal transmitted by a serving cell, and when the terminal equipment selects the first downlink reference signal and/or the second downlink reference signal, a random access preamble(s) to which the first downlink reference signal and/or the second downlink reference signal correspond(s) is/are available; and a random access preamble index, a random access preamble to which the random access preamble index corresponds being used for the first downlink reference signal or the second downlink reference signal in determining candidate beams.

In the embodiment of this disclosure, the third configuration information includes one or more pieces of the following information: a random access preamble index; and an index of a synchronization signal or a broadcast channel.

According to the method of the embodiment of this disclosure, related contents are configured, thereby ensuring the success rate of random access.

In the embodiment of this disclosure, when the first configuration information includes the first downlink reference signal, the first downlink reference signal or the second downlink reference signal may identify a candidate beam and an associated random access parameter used for beam failure recovery.

In the embodiment of this disclosure, the random access preamble index may be a preamble index used by the terminal equipment when selecting a candidate beam identified by the first downlink reference signal or the second downlink reference signal to perform BFR.

In the embodiment of this disclosure, the random access preamble index may be a preamble index used by the terminal equipment when selecting a candidate beam identified by the first downlink reference signal or the second downlink reference signal to perform CFRA.

In the embodiment of this disclosure, the contention-free random access resource may be an RACH occasion, and if Q=1 or Q is not notified or the contention-free random access resource is in an unlicensed frequency band, the number of reference signals of each RACH occasion is ssb-perRACH-Occasion.

In the embodiment of this disclosure, the contention-free random access resource may be an RACH occasion, and the number of reference signals of each RACH occasion is Q*ssb-perRACH-Occasion.

In an embodiment, the first configuration information is a beam failure recovery configuration information element (BeamFailureRecoveryConfig information element). FIG. 8 is a schematic diagram of an example of a part of contents of the beam failure recovery configuration information element. As shown in FIG. 8, in the beam failure recovery configuration information element, the descriptions of the beam failure recovery configuration field (BeamFailureRecoveryConfig field) may be as follows:

| BeamFailureRecoveryConfig field descriptions |
| --- |
| beamFailureRecoveryTimer |
| Timer for beam failure recovery timer. Upon expiration of the timer the UE does not use CFRA for BFR. Value in ms. Value ms10 corresponds to 10 ms, value ms20 corresponds to 20 ms, and so on. |
| candidateBeamRSList |
| A list of reference signals (CSI-RS and/or SSB) identifying the candidate beams for recovery and the associated RA parameters. If the reference signal is SSB, then an SSB has QCL relation with the SSB contained in the list is used to identify the candidate beam for recovery and the associated RA parameters. The network configures these reference signals to be within the linked DL BWP (i.e., within the DL BWP with the same bwp-Id) of the UL BWP in which the BeamFailureRecoveryConfig is provided. |

In addition, as shown in FIG. 8, in the beam failure recovery configuration information element, the descriptions of the beam failure recovery synchronization signal block resource field (BeamFailureRecoveryConfig field) may be as follows:

| BFR-SSB-Resource field descriptions |
| --- |
| ra-PreambleIndex |
| The preamble index that the UE shall use when performing BFR upon selecting the candidate beams identified by this SSB or an SSB has QCL relation with this SSB. |
| ssb |
| The ID of an SSB transmitted by this serving cell. It determines a candidate beam for beam failure recovery (BFR). |

That is, in the embodiment of this disclosure, if there is an SSB that indicates a candidate beam, an SSB having a QCL relationship with SSB included in the candidate beam list may also be used to determine the candidate beam. In addition, a configured random access preamble may be used not only for the candidate beam determined by the SSB, but also for the candidate beam determined by an SSB having a QCL relationship with the SSB.

In an embodiment, the second configuration information is a random access channel dedicated configuration information element (RACH-ConfigDedicated information element). FIG. 9 is a schematic diagram of an example of a part of contents of the random access channel dedicated configuration information element. As shown in FIG. 9, in the random access channel dedicated configuration information element, the descriptions of the contention-free random access (CFRA) field may be as follows:

| CFRA field descriptions |
| --- |
| occasions |
| RA occasions for contention free random access. If the field is absent, the UE uses the RA occasions configured in RACH-ConfigCommon in the first active UL BWP. |
| ra-ssb-OccasionMaskIndex |
| Explicitly signalled PRACH Mask Index for RA Resource selection in TS 36.321. The mask is valid for all SSB resources signalled in ssb-ResourceList. |
| rach-ConfigGeneric |
| Configuration of contention free random access occasions for CFRA. The UE shall ignore preambleReceivedTargetPower, preambleTransMax, powerRampingStep, ra-ResponseWindow signaled within this field and use the corresponding values provided in RACH-ConfigCommon. |
| ssb-perRACH-Occasion |

-continued

CFRA field descriptions

Number of SSBs per RACH occasion, if Q = 1 (or Q is not signalled; or in case of licensed band). Otherwise, the number of SSBs per RACH occasion equals to Q * ssb-perRACH-Occasion.
totalNumberOfRA-Preambles
Total number of preambles used for contention free random access in the RACH resources defined in CFRA, excluding preambles used for other purposes (e.g. for SI request). If the field is absent but the field occasions is present, the UE may assume all the 64 preambles are for RA. The setting should be consistent with the setting of ssb-perRACH-Occasion, if present, i.e. it should be a multiple of the number of SSBs per RACH occasion.

In addition, as shown in FIG. 9, in the random access channel dedicated configuration information element, the descriptions of the contention-free random access (CFRA) synchronization signal block resource field may be as follows:

CFRA-SSB-Resource field descriptions ra-PreambleIndex
The preamble index that the UE shall use when performing CF-RA upon selecting the candidate beams identified by this SSB or an SSB has QCL relation with this SSB.
ssb
The ID of an SSB transmitted by this serving cell. The corresponding preamble index can be used when selecting an SSB has QCL relation with the SSB whose ID is contained.

That is, in the embodiment of this disclosure, Q is taken into account to the number of SSBs of each RACH occasion: the number of SSBs to which each RACH occasion corresponds is ssb-perRACH-Occasion*Q. In addition, the configured random access preamble may be used not only for the candidate beam determined by the SSB, but also for the candidate beam determined by an SSB having a QCL relationship with the SSB. And, using an SSB as an index of a resource includes the SSB and an SSB having a QCL relationship with the SSB.

In an embodiment, the third configuration information is a downlink control information (DCI). The network device may indicate an additional random access preamble index, or indicate an additional SS/PBCH index. For example, a reserved bit in DCI format 1_0 or a new DCI format is used. And fewer bits may also be used to indicate a group of random access preamble indices or former/latter N bits of SS/PBCH indices; where, N is an integer less than or equal to 5 and greater than 1.

According to the method of the embodiment of this disclosure, the success rate of random access is improved.

Embodiment of a Third Aspect

The embodiment of the third aspect of this disclosure provides a random access apparatus, configured in a terminal equipment. As principles of the apparatus for solving problems are similar to that of the method of the embodiment of the first aspect, reference may be made to the implementations of the embodiment of the first aspect for implementations of this apparatus, with identical parts being not going to be described herein any further.

Figure 10:
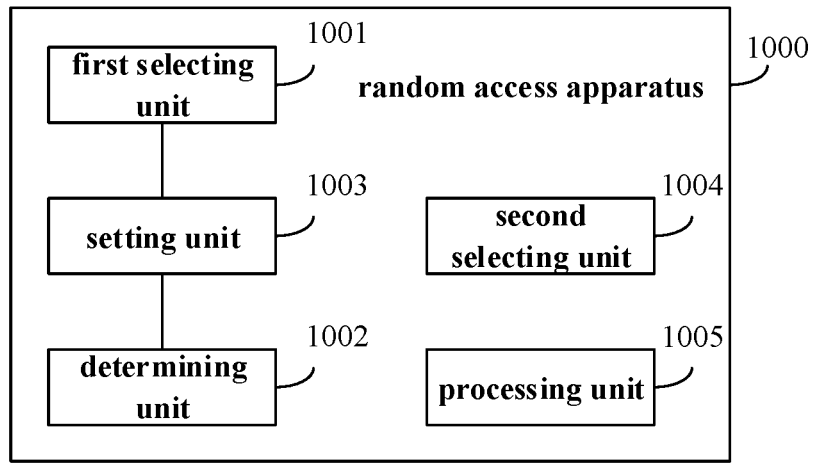
FIG. 10 is a schematic diagram of the random access apparatus of an embodiment of this disclosure.

FIG. 10 is a schematic diagram of the random access apparatus of this embodiment. As shown in FIG. 10, the apparatus 1000 includes: a first selecting unit 1001 and a determining unit 1002. The first selecting unit 1001 is configured to select (or determine) a first downlink reference signal and/or a second downlink reference signal, there existing a quasi co-location (QCL) relationship between the first downlink reference signal and the second downlink reference signal, and the determining unit 1002 is configured to determine (select) a random access resource according to the first downlink reference signal and/or the second downlink reference signal.

In the embodiment of this disclosure, the there existing a QCL relationship between the first downlink reference signal and the second downlink reference signal refers to that the value of A modulo Q to which the first downlink reference signal corresponds is identical to the value of A modulo Q to which the second downlink reference signal corresponds, A being a sequence index of a physical broadcast channel downlink demodulation reference signal (PBCH DMRS), and Q being a parameter or a fixed value configured by a network device.

In the embodiment of this disclosure, as shown in FIG. 10, the apparatus 1000 may further include:
 a setting unit 1003 configured to set (or determine) a random access preamble according to the first downlink reference signal and/or the second downlink reference signal.

In at least one embodiment, if the downlink reference signal selected by the first selecting unit 1001 is included in a downlink control information transmitted by the network device, the setting unit 1003 sets an index of the random access preamble to be an index indicated (or explicitly provided) in the downlink control information, and if the downlink reference signal selected by the first selecting unit 1001 is not included in the downlink control information transmitted by the network device, the setting unit 1003 sets the index of the random access preamble to be an index to which the selected downlink reference signal corresponds (or is associated therewith).

In at least one embodiment, the setting unit 1003 sets an index of the random access preamble to be a random access preamble index (ra-PreambleIndex) to which the first downlink reference signal and/or the second downlink reference signal (the selected downlink reference signal and/or a downlink reference signal having a QCL relationship with the selected downlink reference signal) correspond(s) (or is/are associated therewith).

In at least one embodiment, as shown in FIG. 10, the apparatus 1000 further includes:
 a second selecting unit 1004 configured to select a random access preamble according to the first downlink reference signal and/or the second downlink reference signal, and the setting unit 1003 sets the index of the random access preamble to be an index of the random access preamble selected by the second selecting unit 1004.

In this embodiment, the second selecting unit 1004 may select a random access preamble randomly with equal probability from random access preambles associated with the downlink reference signal selected by the first selecting unit 1001, and the setting unit 1003 sets the index of the random access preamble to be an index of the selected random access preamble.

In this embodiment, if the random access procedure is initiated for a system information request and a resource of the system information request has been indicated (or explicitly provided) by the network device via RRC signaling, the second selecting unit 1004 selects a random access preamble corresponding to the downlink reference signal selected by the first electing unit 1001 from random access preambles determined according to a parameter related to a random access preamble index (ra-PreambleStartIndex), and the setting unit 1003 sets the index of the random access preamble to be an index of the selected random access preamble.

In at least one embodiment, the setting unit 1003 sets the index of the random access preamble to be a random access preamble index (ra-PreambleIndex) to which the first downlink reference signal and/or the second downlink reference signal (the selected downlink reference signal and/or a downlink reference signal having a QCL relationship with the selected downlink reference signal) correspond(s) (or is/are associated therewith).

In at least one embodiment, if the network device indicates (or explicitly provides) the index of the random access preamble via a downlink control information and the index of the random access preamble is not 0b00000, the downlink reference signal (the first downlink reference signal and/or the second downlink reference signal) selected by the first selecting unit 1001 is included in the downlink control information or has a QCL relationship with the downlink reference signal notified by the downlink control information. That is, the first downlink reference signal and/or the second downlink reference signal selected by the first selecting unit 1001 is/are notified by the above downlink control information or have a QCL relationship with the downlink reference signal notified by the downlink control information. For example, the first downlink reference signal is selected, and the first downlink reference signal is notified by the above DCI, or the above second downlink reference signal is notified by the above DCI. For another example, the second downlink reference signal is selected, and the first downlink reference signal is notified by the above DCI, or the second downlink reference signal is notified by the above DCI.

In this embodiment, there exists a QCL relationship between multiple downlink reference signals in the downlink control information, and the downlink reference signals (the first downlink reference signal and/or the second downlink reference signal) selected by the first selecting unit 1001 are selected from the multiple downlink reference signals, and the number of downlink reference signals selected by the first selecting unit 1001 is one or more than one.

In at least one embodiment, the first selecting unit 1001 selects the first downlink reference signal, or selects the second downlink reference signal, or selects both the first downlink reference signal and the second downlink reference signal, if the first downlink reference signal and the second downlink reference signal satisfy at least one of the following conditions that:
RSRP of the first downlink reference signal is above a threshold;
RSRP of the second downlink reference signal is above a threshold;
the first downlink reference signal is included in a reference signal list used for configuring candidate beam for beam failure recovery;
the second downlink reference signal is included in a reference signal list used for configuring candidate beam for beam failure recovery;
the first downlink reference signal is indicated (or provided) by the network device via a downlink control information;
the second downlink reference signal is indicated (or provided) by the network device via a downlink control information;
a contention-free random access resource associated with the first downlink reference signal is indicated (or explicitly provided) by random access channel dedicated configuration information;
a contention-free random access resource associated with the second downlink reference signal is indicated (or explicitly provided) by random access channel dedicated configuration information;
the first downlink reference signal is not configured with a contention-free random access resource or the first downlink reference signal is used for a contention-based random access preamble selection procedure; and
the second downlink reference signal is not configured with a contention-free random access resource or the second downlink reference signal is used for a contention-based random access preamble selection procedure.

In at least one embodiment, if the RSRP of the first downlink reference signal is above a threshold, the first selecting unit 1001 selects the first downlink reference signal, and if the RSRP of the second downlink reference signal is above a threshold, the first selecting unit 1001 selects the second downlink reference signal.

In this embodiment, if the first downlink reference signal satisfies at least one of conditions 1, the first selecting unit 1001 selects the first downlink reference signal, and if the second downlink reference signal satisfies at least one of conditions 2, the first selecting unit 1001 selects the second downlink reference signal.

The conditions 1 include that:
the first downlink reference signal is included in a reference signal list (candidateBeamRSList) used for configuring candidate beam for beam failure recovery;
the first downlink reference signal is indicated (or provided) by the network device via a downlink control information (DCI);
a contention-free random access resource associated with the first downlink reference signal is indicated (or explicitly provided) by random access channel dedicated configuration information (rach-ConfigDedicated); and
the first downlink reference signal is not configured with a contention-free random access resource or the first downlink reference signal is used for a contention-based random access preamble selection procedure.

And the conditions 2 include that:
the second downlink reference signal is included in a reference signal list (candidateBeamRSList) used for configuring candidate beam for beam failure recovery;
the second downlink reference signal is indicated (or provided) by the network device via a downlink control information (DCI);
a contention-free random access resource associated with the second downlink reference signal is indicated (or explicitly provided) by random access channel dedicated configuration information (rach-ConfigDedicated); and
the second downlink reference signal is not configured with a contention-free random access resource or the second downlink reference signal is used for a contention-based random access preamble selection procedure.

In at least one embodiment, if the random access resource associated with the first downlink reference signal is configured, the first selecting unit 1001 selects the first downlink reference signal, and if the random access resource associated with the second downlink reference signal is configured, the first selecting unit 1001 selects the second downlink reference signal.

In this embodiment, if the random access resource satisfies at least one of the following conditions 3, the first selecting unit selects the first downlink reference signal, and if the random access resource satisfies at least one of the following conditions 4, the first selecting unit selects the second downlink reference signal.

Conditions 3 include that:
the random access resource associated with the first downlink reference signal is a contention-free random access resource;
the random access resource associated with the first downlink reference signal is a resource for system information (SI) request.

And conditions 4 include that:
the random access resource associated with the second downlink reference signal is a contention-free random access resource;
the random access resource associated with the second downlink reference signal is a resource for system information (SI) request.

In this embodiment, in at least one example, the contention-free random access resource is a resource requested for beam failure recovery, and the contention-free random access resource is provided by the network device via RRC signaling.

In this embodiment, in at least one example, the contention-free random access resource is indicated (or notified) by the network device via a downlink control information (DCI).

In this example, in at least one example, the random access procedure is initiated for a system information request, and the resource of the system information request is indicated (or explicitly provided) by the network device via RRC signaling.

In the embodiment of this disclosure, the random access resource is a PRACH occasion, and the determining unit 1002 determines (or selects) a next available PRACH occasion from consecutive PRACH occasions.

In this example, the consecutive PRACH occasions refer to PRACH occasions corresponding to the first downlink reference signal, or PRACH occasions corresponding to the second downlink reference signal, or an intersection of PRACH occasions corresponding to the first downlink reference signal and PRACH occasions corresponding to the second downlink reference signal, or a union of PRACH occasions corresponding to the first downlink reference signal and PRACH occasions corresponding to the second downlink reference signal.

In this embodiment, the determining unit 1002 selects a PRACH occasion randomly with equal probability from the consecutive PRACH occasions as the next available PRACH occasion in the MAC entity of the terminal equipment.

In the embodiment of this disclosure, as shown in FIG. 10, the apparatus 1000 further includes:
a processing unit 1005 configured to, if there exists a QCL relationship between the downlink reference signal selected by the first selecting unit 1001 (a fourth downlink reference signal, i.e. the above first downlink reference signal and/or the second downlink reference signal) and a third downlink reference signal, increment a counter related to power ramping by 1, the third downlink reference signal being a downlink reference signal selected in the last random access preamble transmission.

In an embodiment, the downlink reference signal selected by the first selecting unit 1001 is an SSB, the third downlink reference signal is an SSB, and there exists a QCL relationship between the downlink reference signal SSB selected by the first selecting unit 1001 and the third downlink reference signal SSB.

In another embodiment, the third downlink reference signal is a CSI-RS, the downlink reference signal selected by the first selecting unit 1001 is an SSB, and there exists a QCL relationship between an SSB having a QCL relationship with the third downlink reference signal CSI-RS and the SSB selected by the first selecting unit 1001.

In a further embodiment, the third downlink reference signal is an SSB, the downlink reference signal selected by the first selecting unit 1001 is a CSI-RS, and there exists a QCL relationship between an SSB having a QCL relationship with the CSI-RS selected by the first selecting unit 1001 and the third downlink reference signal SSB.

Figure 11:
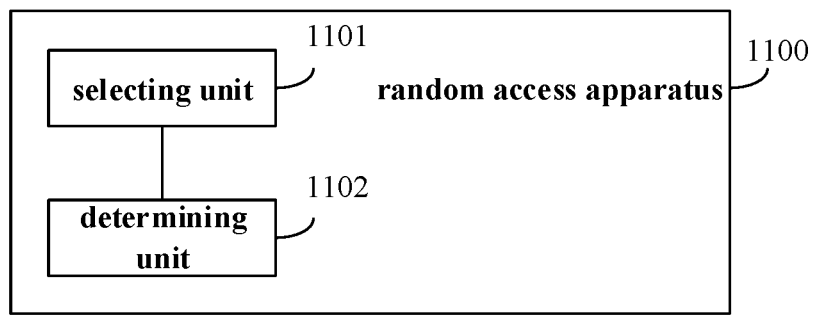
FIG. 11 is another schematic diagram of the random access apparatus of the embodiment of this disclosure.

FIG. 11 is another schematic diagram of the random access apparatus of the embodiment of this disclosure. As shown in FIG. 11, the apparatus 1100 includes a selecting unit 1101 and a determining unit 1102. The selecting unit 1101 is configured to select (or determine) a first downlink reference signal, there existing a quasi co-location (QCL) relationship between the first downlink reference signal and a second downlink reference signal. And the determining unit 1102 is configured to determine a next available PRACH occasion from consecutive PRACH occasions.

In the embodiment of this disclosure, the consecutive PRACH occasions refer to PRACH occasions corresponding to the first downlink reference signal, or PRACH occasions corresponding to the second downlink reference signal, or an intersection of the PRACH occasions corresponding to the first downlink reference signal and the PRACH occasions corresponding to the second downlink reference signal, or a union of the PRACH occasions corresponding to the first downlink reference signal and the PRACH occasions corresponding to the second downlink reference signal.

In at least one embodiment, the determining unit 1102 may select a PRACH occasion randomly with equal probability from the consecutive PRACH occasions as the next available PRACH occasion in the MAC entity of the terminal equipment.

Figure 12:
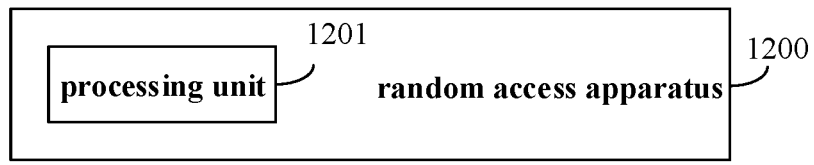
FIG. 12 is a further schematic diagram of the random access apparatus of the embodiment of this disclosure.

FIG. 12 is a further schematic diagram of the random access apparatus of the embodiment of this disclosure. As shown in FIG. 12, the apparatus 1200 includes a processing unit 1201 configured to, if there exists a QCL relationship between the selected downlink reference signal and a downlink reference signal selected in the last random access preamble transmission, increment a counter related to power ramping by 1.

In at least one embodiment, the selected downlink reference signal is an SSB, the downlink reference signal selected in the last random access preamble transmission is an SSB, and there exists a QCL relationship between the selected downlink reference signal SSB and the downlink reference signal SSB selected in the last random access preamble transmission.

In at least one embodiment, the downlink reference signal selected in the last random access preamble transmission is a CSI-RS, the selected downlink reference signal is an SSB, and there exists a QCL relationship between an SSB having a QCL relationship with the downlink reference signal CSI-RS selected in the last random access preamble transmission and the selected downlink reference signal SSB.

In at least one embodiment, the downlink reference signal selected in the last random access preamble transmission is an SSB, the selected downlink reference signal is a CSI-RS, and there exists a QCL relationship between an SSB having a QCL relationship with the selected downlink reference signal CSI-RS and the downlink reference signal SSB selected in the last random access preamble transmission.

According to the apparatus of the embodiment of this disclosure, the success rate of random access is improved.

Embodiment of a Fourth Aspect

The embodiment of the fourth aspect of this disclosure provides a configuration apparatus, configured in a network device. As principles of the apparatus for solving problems are similar to that of the method of the embodiment of the second aspect, reference may be made to the implementations of the embodiment of the second aspect for implementations of this apparatus, with identical parts being not going to be described herein any further.

Figure 13:
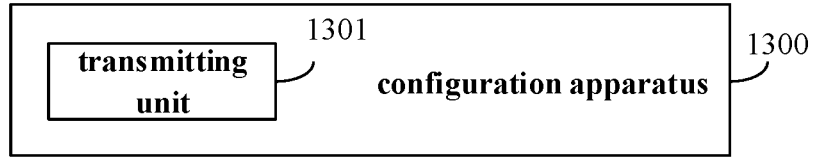
FIG. 13 is a schematic diagram of the configuration apparatus of an embodiment of this disclosure.

FIG. 13 is a schematic diagram of the configuration apparatus 1300 of this embodiment. As shown in FIG. 13, the apparatus 1300 includes:
 a transmitting unit 1301 configured to transmit first configuration information and/or second configuration information and/or third configuration information.

In the embodiment of the disclosure, the first configuration information includes one or more pieces of the following information:
 a first downlink reference signal and/or a second downlink reference signal, there existing a QCL relationship between the first downlink reference signal and the second downlink reference signal; and
 a random access preamble index, a random access preamble to which the random access preamble index corresponds being used for the first downlink reference signal or the second downlink reference signal in determining candidate beams.

In the embodiment of the disclosure, the second configuration information includes one or more pieces of the following information:
 random access channel dedicated configuration information, the random access channel dedicated configuration information indicating contention-free random access resource(s) associated with the first downlink reference signal and/or the second downlink reference signal;
 identification of the first downlink reference signal or the second downlink reference signal, wherein the first downlink reference signal or the second downlink reference signal is a reference signal transmitted by a serving cell, and when the terminal equipment selects the first downlink reference signal and/or the second downlink reference signal, a random access preamble(s) to which the first downlink reference signal and/or the second downlink reference signal correspond(s) is/are available; and
 a random access preamble index, a random access preamble to which the random access preamble index corresponds being used for the first downlink reference signal or the second downlink reference signal in determining candidate beams.

In the embodiment of the disclosure, the third configuration information includes one or more pieces of the following information:
 a random access preamble index; and
 an index of a synchronization signal or a broadcast channel.

In at least one embodiment, the first configuration information is a beam failure recovery configuration information element (BeamFailureRecoveryConfig information element), the second configuration information is a random access channel dedicated configuration information element (RACH-ConfigDedicated information element), and the third configuration information is a downlink control information (DCI).

In at least one embodiment, when the first configuration information includes the first downlink reference signal, the first downlink reference signal or the second downlink reference signal identifies candidate beams used for beam failure recovery and random access parameters associated therewith.

In at least one embodiment, the random access preamble index is a preamble index used by the terminal equipment in selecting the candidate beams identified by the first downlink reference signal or the second downlink reference signal to perform BFR.

In at least one embodiment, the random access preamble index is a preamble index used by the terminal equipment in selecting the candidate beams identified by the first downlink reference signal or the second downlink reference signal to perform CFRA.

In at least one embodiment, the contention-free random access resource is a RACH occasion, and if Q=1 or Q is not notified or the contention-free random access resource is in an unlicensed frequency band, the number of reference signals of each RACH occasion is ssb-perRACH-Occasion.

In at least one embodiment, the contention-free random access resource is an RACH occasion, and the number of reference signals of each RACH occasion is Q*ssb-per-RACH-Occasion.

According to the apparatus of the embodiment of this disclosure, the success rate of random access is improved.

Embodiment of a Fifth Aspect

The embodiment of the disclosure provides a terminal equipment, including the random access apparatus as described in the embodiment of the third aspect.

Figure 14:
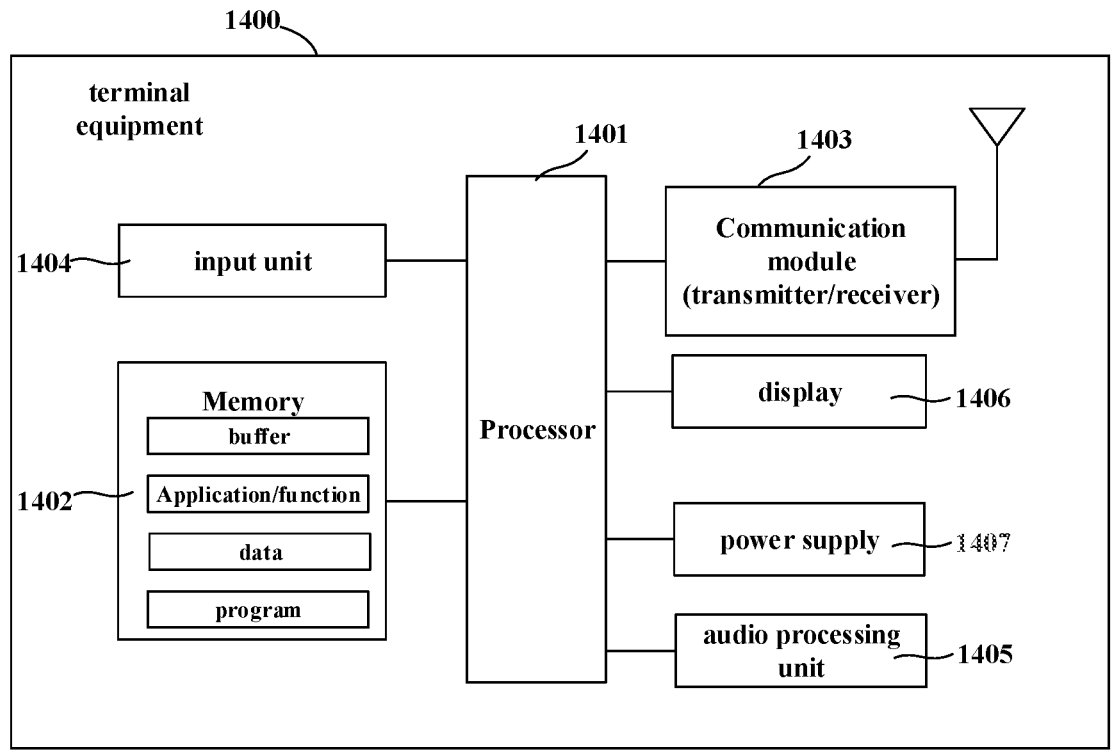
FIG. 14 is a schematic diagram of the terminal equipment of an embodiment of this disclosure.

FIG. 14 is a schematic diagram of the terminal equipment of the embodiment of this disclosure. As shown in FIG. 14, the terminal equipment 1400 may include a central processing unit 1401 and a memory 1402, the memory 1402 being coupled to the central processing unit 1401. It should be noted that this figure is illustrative only, and other types of structures may also be used, so as to supplement or replace this structure and achieve a telecommunications function or other functions.

In one implementation, the functions of the apparatus described in the embodiment of the third aspect may be integrated into the central processing unit 1401, and the central processing unit 1401 executes functions of the apparatus described in the embodiment of the third aspect. The functions of the apparatus described in the embodiment of the third aspect are incorporated herein, and shall not be described herein any further.

In another implementation, the apparatus described in the embodiment of the third aspect and the central processing unit 1401 may be configured separately; for example, the apparatus described in the embodiment of the third aspect may be configured as a chip connected to the central processing unit 1401, and the functions of the apparatus described in the embodiment of the third aspect are executed under control of the central processing unit 1401.

As shown in FIG. 14, the terminal equipment 1400 may further include a communication module 1403, an input unit 1404, an audio processing unit 1405, a display 1406 and a power supply 1407. It should be noted that the terminal equipment 1400 does not necessarily include all the parts shown in FIG. 14. Furthermore, the terminal equipment 1400 may include parts not shown in FIG. 14, and the related art may be referred to.

As shown in FIG. 14, the central processing unit 1401 is sometimes referred to as a controller or an operational control, which may include a microprocessor or other processor devices and/or logic devices. The central processing unit 1401 receives input and controls operations of components of the terminal equipment 1400.

The memory 1402 may be, for example, one or more of a buffer memory, a flash memory, a hard drive, a mobile medium, a volatile memory, a nonvolatile memory, or other suitable devices, which may store various data, etc., and furthermore, store programs executing information processing. And the central processing unit 1401 may execute programs stored in the memory 1402, so as to realize information storage or processing, etc. Functions of other parts are similar to those of the related art, which shall not be described herein any further. The parts of the terminal equipment 1400 may be realized by specific hardware, firmware, software, or any combination thereof, without departing from the scope of this disclosure.

With the terminal equipment of this embodiment, the success rate of random access is improved.

Embodiment of a Sixth Aspect

The embodiment of the disclosure provides a network device, including the configuration apparatus described in the embodiment of the fourth aspect.

Figure 15:
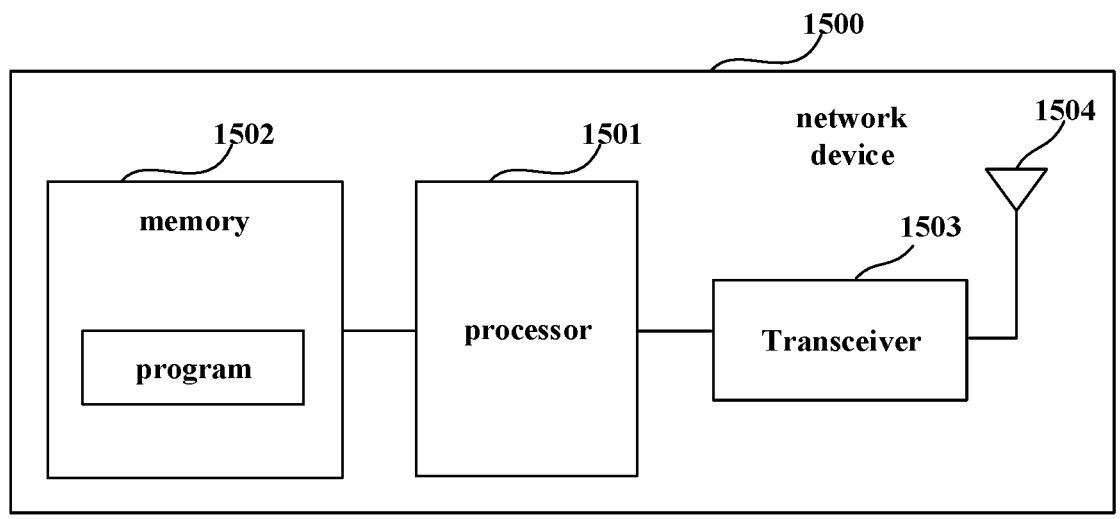
FIG. 15 is a schematic diagram of the network device of an embodiment of this disclosure.

FIG. 15 is a schematic diagram of the network device of the embodiment of this disclosure. As shown in FIG. 15, the network device 1500 may include a central processing unit (CPU) 1501 and a memory 1502, the memory 1502 being coupled to the central processing unit 1501. The memory 1502 may store various data, and furthermore, it may store a program for information processing, and execute the program under control of the central processing unit 1501, so as to receive various information transmitted by a terminal equipment, and transmit various information to the terminal equipment.

In one implementation, the functions of the apparatus described in the embodiment of the fourth aspect may be integrated into the central processing unit 1501, and the central processing unit 1501 executes functions of the apparatus described in the embodiment of the fourth aspect. The functions of the apparatus described in the embodiment of the fourth aspect are incorporated herein, and shall not be described herein any further.

In another embodiment, the apparatus described in the embodiment of the fourth aspect and the central processing unit 1501 may be configured separately; for example, the apparatus described in the embodiment of the fourth aspect may be configured as a chip connected to the central processing unit 1501, and the functions of the apparatus described in the embodiment of the fourth aspect are executed under control of the central processing unit 1501.

Furthermore, as shown in FIG. 15, the network device 1500 may include a transceiver 1503, and an antenna 1504, etc. Functions of the above components are similar to those in the related art, and shall not be described herein any further. It should be noted that the network device 1500 does not necessarily include all the parts shown in FIG. 15. Furthermore, the network device 1500 may include parts not shown in FIG. 15, and the related art may be referred to.

With the network device of this embodiment, the success rate of random access is improved.

Embodiment of a Seventh Aspect

The embodiment of the second aspect provides a communication system, including a network device and a terminal equipment. The network device is, for example, the network device 1500 described in the embodiment of the sixth aspect, and the terminal equipment is, for example, the terminal equipment 1400 described in the embodiment of the fifth aspect.

In this embodiment, the terminal equipment is, for example, a UE served by a gNB, and may include conventional compositions and functions of a terminal equipment in addition to the functions of the apparatus described in the embodiment of the third aspect, which are as described in the embodiment of the fifth aspect, and shall not be described herein any further.

In this embodiment, the network device may be, for example, a gNB in NR, and may include conventional compositions and functions of a network device in addition to the functions of the apparatus described in the embodiment of the fourth aspect, which are as described in the embodiment of the sixth aspect, and shall not be described herein any further.

With the communication system of this embodiment, the success rate of random access is improved.

An embodiment of this disclosure provides a computer readable program, which, when executed in a terminal equipment, will cause a computer to carry out the method described in the embodiment of the first aspect in the terminal equipment.

An embodiment of this disclosure provides a storage medium storing a computer readable program, which will cause a computer to carry out the method described in the embodiment of the first aspect in a terminal equipment.

An embodiment of this disclosure provides a computer readable program, which, when executed in a network device, will cause a computer to carry out the method described in the embodiment of the second aspect in the network device.

An embodiment of this disclosure provides a storage medium storing a computer readable program, which will cause a computer to carry out the method described in the embodiment of the second aspect in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in figures may either correspond to software modules of procedures of a computer program, or correspond to hardware modules. Such software modules may respectively correspond to the steps shown in figures. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in figures may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

As to the above implementations disclosed in the embodiments, following supplements are further disclosed.

1. A random access apparatus, configured in a terminal equipment, the apparatus including:
   a first selecting unit configured to select (or determine) a first downlink reference signal and/or a second downlink reference signal, there existing a quasi co-location (QCL) relationship between the first downlink reference signal and the second downlink reference signal; and
   a determining unit configured to determine (or select) a random access resource according to the first downlink reference signal and/or the second downlink reference signal.

2. The apparatus according to supplement 1, wherein the there existing a QCL relationship between the first downlink reference signal and the second downlink reference signal refers to that the value of A modulo Q to which the first downlink reference signal corresponds is identical to the value of A modulo Q to which the second downlink reference signal corresponds, A being a sequence index of a physical broadcast channel downlink demodulation reference signal (PBCH DMRS), and Q being a parameter or a fixed value configured by a network device.

3. The apparatus according to supplement 1 or 2, wherein the apparatus further includes:
   a setting unit configured to set (or determine) a random access preamble according to the first downlink reference signal and/or the second downlink reference signal.

3.0. The apparatus according to supplement 3, wherein,
   if the downlink reference signal selected by the first selecting unit is included in a downlink control information transmitted by a network device, the setting unit sets an index of the random access preamble to be an index indicated (or explicitly provided) in the downlink control information;
   and if the downlink reference signal selected by the first selecting unit is not included in the downlink control information transmitted by the network device, the setting unit sets the index of the random access preamble to be an index to which a selected downlink control information corresponds (or is associated therewith).

3.1. The apparatus according to supplement 3, wherein,
   the setting unit sets the index of the random access preamble to be a random access preamble index (ra-PreambleIndex) to which the first downlink reference signal and/or the second downlink reference signal (the selected downlink reference signal or a downlink reference signal having a QCL relationship with the selected downlink reference signal) correspond(s) (or is/are associated therewith).

3.2. The apparatus according to supplement 3, wherein the apparatus further includes:
   a second selecting unit configured to select a random access preamble according to the first downlink reference signal and/or the second downlink reference signal;
   and the setting unit sets the index of the random access preamble to be an index of the random access preamble selected by the second selecting unit.

3.3. The apparatus according to supplement 3.2, wherein,
   the second selecting unit selects a random access preamble randomly with equal probability from random access preambles associated with the downlink reference signal selected by the first selecting unit.

3.4. The apparatus according to supplement 3.2, wherein,
   if the random access procedure is initiated for a system information request and a resource of the system information request has been indicated (or explicitly provided) by the network device via RRC signaling, the second selection unit selects a random access preamble corresponding to the downlink reference signal selected by the first selecting unit from the random access preambles determined according to parameters related to random access preamble indices, and the setting unit sets the index of the random access preamble to be an index of the selected random access preamble.

4. The apparatus according to any one of supplements 1-3, wherein,
   if the network device indicates (or explicitly provides) the index of the random access preamble via a downlink control information and the index of the random access preamble is not 0b00000, the downlink reference signal selected by the first selecting unit is included in the downlink control information or has a QCL relationship with a downlink reference signal notified by the downlink control information.

4.1. The apparatus according to supplement 4, wherein there exists a QCL relationship between multiple downlink reference signals in the downlink control information, the downlink reference signals selected by the first selecting unit are selected from the multiple downlink reference signals, and the number of the downlink reference signals selected by the first selecting unit is one or more than one.

5. The apparatus according to any one of supplements 1-3, wherein the first selecting unit selects the first downlink reference signal if the first downlink reference signal and the second downlink reference signal satisfy at least one of the following conditions that:

RSRP of the first downlink reference signal is above a threshold;

RSRP of the second downlink reference signal is above a threshold;

the first downlink reference signal is included in a reference signal list used for configuring candidate beam for beam failure recovery;

the second downlink reference signal is included in the reference signal list used for configuring candidate beam for beam failure recovery;

the first downlink reference signal is indicated (or provided) by a network device via a downlink control information;

the second downlink reference signal is indicated (or provided) by a network device via a downlink control information;

a contention-free random access resource associated with the first downlink reference signal is indicated (or explicitly provided) by random access channel dedicated configuration information;

a contention-free random access resource associated with the second downlink reference signal is indicated (or explicitly provided) by random access channel dedicated configuration information;

the first downlink reference signal is not configured with a contention-free random access resource or the first downlink reference signal is used for a contention-based random access preamble selection procedure; and the second downlink reference signal is not configured with a contention-free random access resource or the second downlink reference signal is used for a contention-based random access preamble selection procedure.

6. The apparatus according to any one of supplements 1-3, wherein the first selecting unit selects the second downlink reference signal if the first downlink reference signal and the second downlink reference signal satisfy at least one of the following conditions that:

RSRP of the first downlink reference signal is above a threshold;

RSRP of the second downlink reference signal is above a threshold;

the first downlink reference signal is included in a reference signal list used for configuring candidate beam for beam failure recovery;

the second downlink reference signal is included in the reference signal list used for configuring candidate beam for beam failure recovery;

the first downlink reference signal is indicated (or provided) by a network device via a downlink control information;

the second downlink reference signal is indicated (or provided) by a network device via a downlink control information;

a contention-free random access resource associated with the first downlink reference signal is indicated (or explicitly provided) by random access channel dedicated configuration information;

a contention-free random access resource associated with the second downlink reference signal is indicated (or explicitly provided) by random access channel dedicated configuration information;

the first downlink reference signal is not configured with a contention-free random access resource or the first downlink reference signal is used for a contention-based random access preamble selection procedure; and the second downlink reference signal is not configured with a contention-free random access resource or the second downlink reference signal is used for a contention-based random access preamble selection procedure.

7. The apparatus according to any one of supplements 1-3, wherein the first selecting unit selects the first downlink reference signal and the second downlink reference signal if the first downlink reference signal and the second downlink reference signal satisfy at least one of the following conditions that:

RSRP of the first downlink reference signal is above a threshold;

RSRP of the second downlink reference signal is above a threshold;

the first downlink reference signal is included in a reference signal list used for configuring candidate beam for beam failure recovery;

the second downlink reference signal is included in the reference signal list used for configuring candidate beam for beam failure recovery;

the first downlink reference signal is indicated (or provided) by a network device via a downlink control information;

the second downlink reference signal is indicated (or provided) by a network device via a downlink control information;

a contention-free random access resource associated with the first downlink reference signal is indicated (or explicitly provided) by random access channel dedicated configuration information;

a contention-free random access resource associated with the second downlink reference signal is indicated (or explicitly provided) by random access channel dedicated configuration information;

the first downlink reference signal is not configured with a contention-free random access resource or the first downlink reference signal is used for a contention-based random access preamble selection procedure; and the second downlink reference signal is not configured with a contention-free random access resource or the second downlink reference signal is used for a contention-based random access preamble selection procedure.

8. The apparatus according to any one of supplements 1-3, wherein, if the RSRP of the first downlink reference signal is above a threshold, the first selecting unit selects the first downlink reference signal; otherwise, if the RSRP of the second downlink reference signal is above a threshold, the first selecting unit selects the second downlink reference signal.

8.1. The apparatus according to supplement 8, wherein if the first downlink reference signal satisfies at least one of conditions 1, the first selecting unit selects the first downlink reference signal; otherwise, if the second downlink reference signal satisfies at least one of conditions 2, the first selecting unit selects the second downlink reference signal,
the conditions 1 including that:
the first downlink reference signal is included in a reference signal list used for configuring candidate beam for beam failure recovery;
the first downlink reference signal is indicated (or provided) by a network device via a downlink control information;
a contention-free random access resource associated with the first downlink reference signal is indicated (or explicitly provided) by random access channel dedicated configuration information; and
the first downlink reference signal is not configured with a contention-free random access resource or the first downlink reference signal is used for a contention-based random access preamble selection procedure;
and the conditions 2 including that:
the second downlink reference signal is included in a reference signal list used for configuring candidate beam for beam failure recovery;
the second downlink reference signal is indicated (or provided) by a network device via a downlink control information;
a contention-free random access resource associated with the second downlink reference signal is indicated (or explicitly provided) by random access channel dedicated configuration information; and
the second downlink reference signal is not configured with a contention-free random access resource or the second downlink reference signal is used for a contention-based random access preamble selection procedure.

9. The apparatus according to any one of supplements 1-3, wherein,
if the random access resource associated with the first downlink reference signal is configured, the first selecting unit selects the first downlink reference signal; otherwise, if the random access resource associated with the second downlink reference signal is configured, the first selecting unit selects the second downlink reference signal.

9.1. The apparatus according to supplement 9, wherein if the random access resource satisfies at least one of the following conditions 3, the first selecting unit selects the first downlink reference signal; otherwise, if the random access resource satisfies at least one of the following conditions 4, the first selecting unit selects the second downlink reference signal,
conditions 3 including that:
the random access resource associated with the first downlink reference signal is a contention-free random access resource;
the random access resource associated with the first downlink reference signal is a resource for system information (SI) request;
and conditions 4 including that:
the random access resource associated with the second downlink reference signal is a contention-free random access resource;
the random access resource associated with the second downlink reference signal is a resource for system information (SI) request.

9.1.1. The apparatus according to supplement 9.1, wherein the contention-free random access resource is a resource requested for beam failure recovery, and the contention-free random access resource is provided by the network device via RRC signaling.

9.1.2. The apparatus according to supplement 9.1, wherein the contention-free random access resource is indicated (or notified) by the network device via a downlink control information (DCI).

9.1.3. The apparatus according to supplement 9.1, wherein the random access procedure is initiated for a system information request, and a resource of the system information request is indicated (or explicitly provided) by the network device via RRC signaling.

10. The apparatus according to any one of supplements 1-3, wherein the random access resource is a PRACH occasion, and the determining unit determines (or selects) a next available PRACH occasion from consecutive PRACH occasions, the consecutive PRACH occasions referring to PRACH occasions corresponding to the first downlink reference signal, or PRACH occasions corresponding to the second downlink reference signal, or an intersection of PRACH occasions corresponding to the first downlink reference signal and PRACH occasions corresponding to the second downlink reference signal, or a union of PRACH occasions corresponding to the first downlink reference signal and PRACH occasions corresponding to the second downlink reference signal.

10.1. The apparatus according to supplement 10, wherein the determining unit selects a PRACH occasion randomly with equal probability from the consecutive PRACH occasions as the next available PRACH occasion in an MAC entity of the terminal equipment.

11. The apparatus according to any one of supplements 1-3, wherein the apparatus further includes:
a processing unit configured to, if there exists a QCL relationship between a downlink reference signal selected by the first selecting unit and a third downlink reference signal, increment a counter related to power ramping by 1, the third downlink reference signal being a downlink reference signal selected in the last random access preamble transmission.

11.1. The apparatus according to supplement 11, wherein the downlink reference signal selected by the first selecting unit is an SSB, the third downlink reference signal is an SSB, and there exists a QCL relationship between the downlink reference signal SSB selected by the first selecting unit and the third downlink reference signal SSB.

11.2. The apparatus according to supplement 11, wherein the third downlink reference signal is a CSI-RS, the downlink reference signal selected by the first selecting unit is an SSB, and there exists a QCL relationship between an SSB having a QCL relationship with the third downlink reference signal CSI-RS and the downlink reference signal SSB selected by the first selecting unit.

11.3. The apparatus according to supplement 11, wherein the third downlink reference signal is an SSB, the downlink reference signal selected by the first selecting unit is a CSI-RS, and there exists a QCL relationship between an SSB having a QCL relationship with the downlink reference signal CSI-RS selected by the first selecting unit and the third downlink reference signal SSB.

1A. A random access apparatus, configured in a terminal equipment, wherein the apparatus includes:
a selecting unit configured to select (or determine) a first downlink reference signal, there existing a quasi co-location (QCL) relationship between the first downlink reference signal and a second downlink reference signal; and
a determining unit configured to determine a next available PRACH occasion from consecutive PRACH occasions,
the consecutive PRACH occasions referring to PRACH occasions corresponding to the first downlink reference signal, or PRACH occasions corresponding to the second downlink reference signal, or an intersection of the PRACH occasions corresponding to the first downlink reference signal and the PRACH occasions corresponding to the second downlink reference signal, or a union of the PRACH occasions corresponding to the first downlink reference signal and the PRACH occasions corresponding to the second downlink reference signal.

2A. The apparatus according to supplement 1A, wherein the determining unit selects a PRACH occasion randomly with equal probability from the consecutive PRACH occasions as the next available PRACH occasion in the MAC entity of the terminal equipment.

1B. A random access apparatus, configured in a terminal equipment, wherein the apparatus includes:
a processing unit configured to, if there exists a QCL relationship between a selected downlink reference signal and a reference signal selected in the last random access preamble transmission, increment a counter related to power ramping by 1.

2B. The apparatus according to supplement 1B, wherein the selected downlink reference signal is an SSB, the downlink reference signal selected in the last random access preamble transmission is an SSB, and there exists a QCL relationship between the selected downlink reference signal SSB and the downlink reference signal SSB selected in the last random access preamble transmission.

3B. The apparatus according to supplement 1B, wherein the selected downlink reference signal is an SSB, the downlink reference signal selected in the last random access preamble transmission is a CSI-RS, and there exists a QCL relationship between the selected downlink reference signal SSB and an SSB having a QCL relationship with the downlink reference signal CSI-RS selected in the last random access preamble transmission.

4B. The apparatus according to supplement 1B, wherein the selected downlink reference signal is a CSI-RS, the downlink reference signal selected in the last random access preamble transmission is an SSB, and there exists a QCL relationship between an SSB having a QCL relationship with the selected downlink reference signal CSI-RS and the downlink reference signal SSB selected in the last random access preamble transmission.

1C. A configuration apparatus, configured in a network device, wherein the apparatus includes:
a transmitting unit configured to transmit first configuration information and/or second configuration information and/or third configuration information to a terminal equipment;
wherein the first configuration information includes one or more pieces of the following information:
a first downlink reference signal and/or a second downlink reference signal, there existing a QCL relationship between the first downlink reference signal and the second downlink reference signal; and
a random access preamble index, a random access preamble to which the random access preamble index corresponds being used for the first downlink reference signal or the second downlink reference signal in determining candidate beams;
wherein the second configuration information includes one or more pieces of the following information:
random access channel dedicated configuration information, the random access channel dedicated configuration information indicating contention-free random access resource(s) associated with the first downlink reference signal and/or the second downlink reference signal;
identification of the first downlink reference signal or the second downlink reference signal, wherein the first downlink reference signal or the second downlink reference signal is a reference signal transmitted by a serving cell, and when the terminal equipment selects the first downlink reference signal and/or the second downlink reference signal, a random access preamble(s) to which the first downlink reference signal and/or the second downlink reference signal correspond(s) is/are available; and
a random access preamble index, a random access preamble to which the random access preamble index corresponds being used for the first downlink reference signal or the second downlink reference signal in determining candidate beams;
wherein the third configuration information includes one or more pieces of the following information:
a random access preamble index; and
an index of a synchronization signal or a broadcast channel.

1.1C. The apparatus according to supplement 1C, wherein the first configuration information is a beam failure recovery configuration information element (BeamFailureRecovery-Config information element), the second configuration information is a random access channel dedicated configuration information element (RACH-ConfigDedicated information element), and the third configuration information is a downlink control information (DCI).

2C. The apparatus according to supplement 1C, wherein when the first configuration information includes the first downlink reference signal, the first downlink reference signal or the second downlink reference signal identifies candidate beams used for beam failure recovery and random access parameters associated therewith.

3C. The apparatus according to supplement 1C, wherein the random access preamble index is a preamble index used by the terminal equipment in selecting the candidate beams identified by the first downlink reference signal or the second downlink reference signal to perform BFR.

4C. The apparatus according to supplement 1C, wherein the random access preamble index is a preamble index used by the terminal equipment in selecting the candidate beams identified by the first downlink reference signal or the second downlink reference signal to perform CFRA.

5C. The apparatus according to supplement 1C, wherein the contention-free random access resource is a RACH occasion, and if Q=1 or Q is not notified or the contention-free random access resource is in an unlicensed frequency band, the number of reference signals of each RACH occasion is ssb-perRACH-Occasion.

6C. The apparatus according to supplement 1C, wherein the contention-free random access resource is an RACH occasion, and the number of reference signals of each RACH occasion is Q*ssb-perRACH-Occasion.

The invention claimed is:

1. A random access apparatus, configured in a terminal equipment for operation with shared spectrum, the apparatus comprising:
a memory; and
processor circuitry coupled with the memory, and configured to:
select a value associated with a first downlink reference signal and a second downlink reference signal, there existing a quasi co-location (QCL) relationship between the first downlink reference signal and the second downlink reference signal; and
determine a random access resource according to the value,
wherein there exists a QCL relationship between the first downlink reference signal and the second downlink reference signal refers to that the value of A modulo Q to which the first downlink reference signal corresponds is identical to the value of A modulo Q to which the second downlink reference signal corresponds, A being a sequence index of a physical broadcast channel downlink demodulation reference signal (PBCH DMRS), and Q being a parameter or a fixed value configured by a network device.

2. The apparatus according to claim 1, wherein the processor circuitry is further configured to set a random access preamble according to the value associated with the first downlink reference signal and the second downlink reference signal.

3. The apparatus according to claim 2, wherein, the processor circuitry is further configured to set an index of the random access preamble to be a random access preamble index (ra-PreambleIndex) to which the value correspond(s).

4. The apparatus according to claim 2, wherein the processor circuitry is further configured to:
select a random access preamble according to the value associated with the first downlink reference signal and the second downlink reference signal; and
the set the index of the random access preamble to be an index of the random access preamble selected by the processor circuitry.

5. The apparatus according to claim 1, wherein the processor circuitry is further configured to select a value associated with a first downlink reference signal and a second downlink reference signal, the first downlink reference signal and the second downlink reference signal satisfy at least one of the following conditions that:
RSRP of the first downlink reference signal is above a threshold;
RSRP of the second downlink reference signal is above a threshold;
the first downlink reference signal is included in a reference signal list used for configuring candidate beam for beam failure recovery;
the second downlink reference signal is included in a reference signal list used for configuring candidate beam for beam failure recovery;
the first downlink reference signal is indicated by a network device via a downlink control information;
the second downlink reference signal is indicated by a network device via a downlink control information;
a contention-free random access resource associated with the first downlink reference signal is indicated by random access channel dedicated configuration information;
a contention-free random access resource associated with the second downlink reference signal is indicated by random access channel dedicated configuration information;
the first downlink reference signal is not configured with a contention-free random access resource or the first downlink reference signal is used for a contention-based random access preamble selection procedure; and
the second downlink reference signal is not configured with a contention-free random access resource or the second downlink reference signal is used for a contention-based random access preamble selection procedure.

6. The apparatus according to claim 1, wherein the random access resource is a PRACH occasion, and the processor circuitry determines a next available PRACH occasion from consecutive PRACH occasions, the consecutive PRACH occasions referring to PRACH occasions corresponding to the first downlink reference signal, or
PRACH occasions corresponding to the second downlink reference signal, or an intersection of PRACH occasions corresponding to the first downlink reference signal and PRACH occasions corresponding to the second downlink reference signal, or a union of PRACH occasions corresponding to the first downlink reference signal and PRACH occasions corresponding to the second downlink reference signal.

7. The apparatus according to claim 1, wherein the processor circuitry is further configured to, if there exists a QCL relationship between a downlink reference signal selected by the processor circuitry and a third downlink reference signal, increment a counter related to power ramping by 1, the third downlink reference signal being a downlink reference signal selected in the last random access preamble transmission.

8. The apparatus according to claim 7, wherein the downlink reference signal selected by the processor circuitry is an SSB, the third downlink reference signal is an SSB, and there exists a QCL relationship between the downlink reference signal SSB selected by the processor circuitry and the third downlink reference signal SSB.

9. A configuration apparatus, configured in a network device, the apparatus comprising:
a transmitter configured to transmit first configuration information and/or second configuration information and/or third configuration information to a terminal equipment;
wherein, the first configuration information comprises one or more pieces of the following information:
a first downlink reference signal and/or a second downlink reference signal, there existing a QCL relationship between the first downlink reference signal and the second downlink reference signal; and
a random access preamble index, a random access preamble to which the random access preamble index corresponds being used for the first downlink reference signal or the second downlink reference signal in determining candidate beams;
the second configuration information comprises one or more pieces of the following information:
random access channel dedicated configuration information, the random access channel dedicated configuration information indicating contention-free random access resource(s) associated with the first downlink reference signal and/or the second downlink reference signal;

identification of the first downlink reference signal or the second downlink reference signal, wherein the first downlink reference signal or the second downlink reference signal is a reference signal transmitted by a serving cell, and when the terminal equipment selects the first downlink reference signal and/or the second downlink reference signal, a random access preamble(s) to which the first downlink reference signal and/or the second downlink reference signal correspond(s) is/are available; and a random access preamble index, a random access preamble to which the random access preamble index corresponds being used for the first downlink reference signal or the second downlink reference signal in determining candidate beams;

the third configuration information comprises one or more pieces of the following information:

a random access preamble index; and an index of a synchronization signal or a broadcast channel.

10. The apparatus according to claim 9, wherein the first configuration information is a beam failure recovery configuration information element, the second configuration information is a random access channel dedicated configuration information element, and the third configuration information is a downlink control information (DCI).

11. The apparatus according to claim 9, wherein when the first configuration information comprises the first downlink reference signal, the first downlink reference signal or the second downlink reference signal identifies candidate beams used for beam failure recovery and random access parameters associated therewith.

12. The apparatus according to claim 9, wherein the random access preamble index is a preamble index used by the terminal equipment in selecting the candidate beams identified by the first downlink reference signal or the second downlink reference signal to perform BFR.

13. The apparatus according to claim 9, wherein the random access preamble index is a preamble index used by the terminal equipment in selecting the candidate beams identified by the first downlink reference signal or the second downlink reference signal to perform CFRA.

14. The apparatus according to claim 9, wherein the contention-free random access resource is a RACH occasion, and if Q=1 or Q is not notified or the contention-free random access resource is in an unlicensed frequency band, the number of reference signals of each RACH occasion is ssb-perRACH-Occasion.

* * * * *